(12) United States Patent
Shade et al.

(10) Patent No.: US 12,527,804 B2
(45) Date of Patent: *Jan. 20, 2026

(54) MICROEMULSION DELIVERY SYSTEMS FOR ALCOHOL-SOLUBLE SPECIES INCLUDING DHEA, PREGNENOLONE, AND CHRYSIN FOR REDUCING MENOPAUSAL SYMPTOMS

(71) Applicant: Quicksilver Scientific, Inc., Louisville, CO (US)

(72) Inventors: Christopher W. Shade, Louisville, CO (US); Steven Tieu, Louisville, CO (US)

(73) Assignee: Quicksilver Scientific, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/972,754

(22) Filed: Oct. 25, 2022

(65) Prior Publication Data
US 2023/0127581 A1    Apr. 27, 2023

Related U.S. Application Data

(60) Provisional application No. 63/272,358, filed on Oct. 27, 2021.

(51) Int. Cl.
| | | |
|---|---|---|
| *A61K 31/5685* | (2006.01) | |
| *A61K 9/107* | (2006.01) | |
| *A61K 31/355* | (2006.01) | |
| *A61K 36/752* | (2006.01) | |
| *A61K 47/14* | (2017.01) | |
| *A61K 47/24* | (2006.01) | |
| *A61K 47/26* | (2006.01) | |

(52) U.S. Cl.
CPC ........ *A61K 31/5685* (2013.01); *A61K 9/1075* (2013.01); *A61K 31/355* (2013.01); *A61K 36/752* (2013.01); *A61K 47/14* (2013.01); *A61K 47/24* (2013.01); *A61K 47/26* (2013.01)

(58) Field of Classification Search
CPC .............. A61K 31/5685; A61K 9/1075; A61K 31/355; A61K 36/752; A61K 47/14; A61K 47/24; A61K 47/26; A61K 9/0053; A61K 31/00; A61K 31/05; A61K 31/352; A61K 31/565; A61K 31/568; A61K 36/232; A61K 36/258; A61K 36/31; A61K 47/10; A61K 47/44

See application file for complete search history.

(56) References Cited

U.S. PATENT DOCUMENTS

| | | | |
|---|---|---|---|
| 5,565,439 A | 10/1996 | Piazza et al. | |
| 5,935,588 A | 8/1999 | Afriat et al. | |
| 6,235,271 B1 | 5/2001 | Luther et al. | |
| 6,562,369 B2 | 5/2003 | Luo et al. | |
| 2001/0036483 A1 | 11/2001 | Luo et al. | |
| 2002/0082780 A1 | 6/2002 | Alexis | |
| 2004/0077724 A1 | 4/2004 | Remmereit et al. | |
| 2004/0127476 A1 | 7/2004 | Kershman et al. | |
| 2004/0219123 A1 | 11/2004 | Astruc et al. | |
| 2004/0253326 A1 | 12/2004 | Mesko | |
| 2007/0160688 A1* | 7/2007 | Marchewitz ........... | A61K 36/37 424/759 |
| 2009/0069279 A1 | 3/2009 | Astruc et al. | |
| 2010/0173882 A1 | 7/2010 | Giliyar et al. | |
| 2010/0297230 A1 | 11/2010 | Fletcher | |
| 2012/0149783 A1 | 6/2012 | Aust et al. | |
| 2013/0045271 A1 | 2/2013 | Dadey et al. | |
| 2015/0125498 A1 | 5/2015 | Dejmek et al. | |
| 2016/0015719 A1 | 1/2016 | Chien-Hung et al. | |
| 2016/0193146 A1 | 7/2016 | Bromley | |

(Continued)

FOREIGN PATENT DOCUMENTS

| | | |
|---|---|---|
| CN | 102036572 A | 4/2011 |
| CN | 102309445 A | 3/2013 |

(Continued)

OTHER PUBLICATIONS

"NAS"; DHEA Cream for Women | Hormone-Solutions. Aug. 15, 2020, https://web.archive.org/web/20200815143437/https://www.hormonesolutionscenter.com/product-page/dhea-cream-for-women (Year: 2020).*

Menopause & Herbs | Jean Hailes. Mar. 15, 2019, https://web.archive.org/web/20190315125759/https://www.jeanhailes.org.au/health-a-z/natural-therapies-supplements/menopause-herbs (Year: 2019).*

Ataman Chemicals , "1,3-BG (1,3 Butylene Glycol)", Online Article at AtamanChemicals.con, under products (2020), p. 1-8 (the entire document , and more specifically; p. 1, para 2; p. 2, para 8; p. 3 para 8; p. 4, para 1 and para 9. URL: https://www.atamanchemicals.com/1-3-bg-1-3butylene-glycol_u27445/, 2020, 8 Pages.

Cambrdge Polymer Group , "Pharmaceutical Excipient Testing", online article in Campoly.com, under Pharmaceutical Testing and Development, Polymer Excipient Analysis for Pharmaceutical Applications; (Dec. 2017), p. 1-6 (the entire document, and more specifically; p. 4, para 6, Dec. 13, 2017, 6 Pages.

(Continued)

*Primary Examiner* — Clinton A Brooks
*Assistant Examiner* — Kyle Nottingham
(74) *Attorney, Agent, or Firm* — Blanchard Horton PLLC

(57) ABSTRACT

Microemulsions are described where hydrophobic liquid droplets are distributed in a continuous hydrophilic liquid phase. In relation to conventional oil-in-water (OIW) microemulsions, the described microemulsions may be thought of as modified oil-in-water (MOIW) microemulsions, where both the "oil" and "water" phases of the microemulsion are modified. The oil phase droplets of the MOIW microemulsion are modified with alcohol and can solubilize alcohol-soluble species, including nonderivatized hormones. More preferably, the modified oil phase droplets of the MOIW microemulsion directly solubilize nonderivatized hormones. The oil phase droplets of the MOIW microemulsion include DHEA, pregnenolone, and a polyphenol, where a ratio of DHEA to polyphenol is from 1:1 to 12:1 by weight. Methods of supporting and/or increasing bloodstream hormone levels in perimenopausal and postmenopausal females and improving menopausal symptoms also are disclosed.

60 Claims, 3 Drawing Sheets

(56) References Cited

U.S. PATENT DOCUMENTS

| | | | |
|---|---|---|---|
| 2017/0143664 | A1 | 5/2017 | Ankner |
| 2017/0319534 | A1 | 11/2017 | Trimble |
| 2017/0333446 | A1 | 11/2017 | Rosado |
| 2018/0021349 | A1 | 1/2018 | Dhingra et al. |
| 2018/0042845 | A1 | 2/2018 | Sinai et al. |
| 2019/0008770 | A1 | 1/2019 | Garti et al. |
| 2023/0114405 | A1 | 4/2023 | Shade et al. |
| 2024/0335381 | A1 | 10/2024 | Shade et al. |

FOREIGN PATENT DOCUMENTS

| | | | |
|---|---|---|---|
| CN | 103429100 | A | 9/2015 |
| CN | 105188670 | A | 11/2018 |
| WO | 2001026618 | A2 | 4/2001 |
| WO | 2009117152 | A1 | 9/2009 |
| WO | 2014143127 | A1 | 9/2014 |
| WO | 2018061007 | A1 | 4/2018 |
| WO | 2021046374 | A2 | 3/2021 |
| WO | 2021077061 | A1 | 4/2021 |
| WO | 2023076042 | A1 | 5/2023 |
| WO | 2023076455 | A1 | 5/2023 |

OTHER PUBLICATIONS

Int'l Searching Authority, "International Search Report and Written Opinion", PCT Patent Application PCT/US22/46677, Feb. 27, 2023., 29 pages.

Int'l Searching Authority, "International Search Report and Writtene Opinion", PCT Patent Application PCT/US22/47995, Mar. 28, 2023., 15 pages.

Snyman, M., "Topical delivery of selected female hormones from different formulations", Thesis submitted to North-West University; Potchefstroom, South Africa; accessed on web at: http://repository.nwu.ac.za/handle/10394/34953; May 2020 (May 2020) Abstract, pp. 63-86, May 2020, 24.

"Micelle", From Wikipedia, the free encyclopedia; https://en.wikipedia.org/wiki/Micelle, Jul. 9, 2018, 6 Pages.

Amory, et al., "Oral Testosterone in Oil Plus Dutasteride in Men: A Pharmacokinetic Study", 0021-972X; The Journal of Clinical Endocrinology & Metabolism 90(5):2610-2617 Printed in U.S.A. Copyright © 2005 by The Endocrine Society doi: 10.1210/jc.2004-1221, May 2005, 8 Pages.

Casson, Peter R, et al., "Delivery of dehydroepiandrosterone to premenopausal women: Effects of micronization and nonoral administration", American Journal of Obstetrics & Gynecology, Feb. 1996, vol. 174, No. 2, pp. 649-653; Presented in part at the Thirty-eighth Annual Meeting of the Society for Gynecologic Investigation, San Antonio, Texas, Mar. 20-23, 1991, Feb. 1996, 4 Pages.

Hsin-Jung, Ho, "Geranylgeranioi enhances testosterone production via the cAMP/protein kinase A pathway in testls-derived i-10 tumor ceils", Hsin-Jung Ho, Hitoshi Shirakawa, Risa Yoshida, Asagi Ito, Misato Maeda, Tomoko Goto & Michio Komai (2016) Geranylgeranioi enhances testosterone production via the cAMP/protein kinase A pathway in testis-derived 1-10 tumor cells., Jan. 13, 2016, 8 Pages.

Kim, Nyung-Sunny, et al., "Ginseng for managing menopause symptoms: a systematic review of randomized clinical trials", Journal of Ginseng Research vol. 37, No. 1, 30-36 (2013) http://dx.doi.org/10.5142/jgr.2013.37.30, 30-36.

Liu, Tracy, "Non Final Rejection", U.S. Appl. No. 13/588,731 Mail Date Dec. 19, 2013 First Named Inventor: Eric Dadey, Dec. 19, 2013, 17 Pages.

McClements, David Julian, "Nanoemulsions versus microemulsions: terminology, differences, and similarities", Soft Matter, 2012, 8, 1719 The Royal Society of Chemistry 2012 www.rsc.org/softmatter DOI: 10.1039/c2sm06903b, 2012, 12 Pages.

Patil, Sanjay B., "Mucoadhesive Microspheres: A Promising Tool in Drug Delivery", Article in Current Drug Delivery Nov. 2008; vol. 5, No. 4 DOI: 10.2174/156720108785914970—Source: PubMed, Nov. 2008, 8 Pages.

Taylor, G T, et al., "Testosterone in a cyclodextrin-containing formulation: behavioral and physiological effects of episode-like pulses in rats.", Testosterone in a cyclodextrin-containing formulation: behavioral and physiological effects of episode-like pulses in rats; (Pharm Res. Jul. 1989; 6(7): 641-6); accepted Feb. 26, 1989, Jul. 6, 1989, 6 Pages.

Young, Lee W., "Written Opinion of the International Searching Authority", International Application No. PCT/US 12/51368 International filing date: Aug. 17, 2012 (Aug. 17, 2012), Oct. 12, 2012, 6 Pages.

Hermann, MD, Anne C., et al., "Over-the-Counter Progesterone Cream Produces Significant Drug Exposure Compared to a Food and Drug Administration-Approved Oral Progesterone Product", Journal of Clinical Pharmacology, 45:614-619, The American College of Clinical Pharmacology, 2005, 6 pages.

Oliveira, Gabriela, et al., "The influence of volatile solvents on transport across model membranes and human skin", International Journal of Pharmaceutics 435, 38-49, May 24, 2012, 12 pages.

European Patent Office, "Supplementary European Search Report", Extended European Search Report, App. No 20861397.6, Aug. 21, 2023, 13 pages.

Innovation Science & Econ Dev CA, "Examination Report under Subsection 86(2)", PCT No. US2020049442, Jun. 12, 2023, 6 pages.

People's Republic of China, "First Review Opinion Notice", State Intellectual Property Office, App. No. 202080077171.8, Jan. 9, 2023, 110 pages.

Canadian IP Office, "Office Action", Application No. 3,151,661, Jun. 13, 2024, 7 pages.

Chinese Patent Office, "Second Review Opinion Notice", Application No. 202080077171.8, Jun. 20, 2024, 185 pages.

Wheeler, Thurman, "Office Action", U.S. Appl. No. 17/672,894, May 13, 2024, 27 pages.

Ho, Hsin-Jung, et al., "Geranylgeraniol enhances testosterone production via the cAMP/protein kinase A pathway in testis-derived 1-10 tumor cells", Bioscience, Biotechnology, and Biochemistry, vol. 80, No. 4, 791-797, 2016, 7 pages.

Patil, Sanjay B., et al., "Mucoadhesive Microspheres: A Promising Tool in Drug Delivery", Current Drug Delivery, 2008, 5, 000-000, Bentham Science Publishers Ltd., 2008, 7 pages.

* cited by examiner

Nanoemulsion Droplet

Microemulsion Droplet

MICROEMULSION DELIVERY SYSTEMS FOR ALCOHOL-SOLUBLE SPECIES INCLUDING DHEA, PREGNENOLONE, AND CHRYSIN FOR REDUCING MENOPAUSAL SYMPTOMS

REFERENCE TO RELATED APPLICATIONS

This application claims the benefit of U.S. Provisional Application No. 63/272,358 entitled "Microemulsion Delivery Systems for An Adaptogenic Female Hormone Blend with Alcohol-Soluble Species Including Nonderivatized Hormones" filed Oct. 27, 2021, and U.S. Provisional Application No. 63/318,132 entitled "Microemulsion Delivery Systems for Alcohol-Soluble Species Including DHEA, Pregnenolone, and Chrysin for Reducing Menopausal Symptoms" filed Mar. 9, 2022, both of which are incorporated by reference in the entirety.

BACKGROUND

While not a disease, menopause is a transition in the life of females associated with changes in hormone levels. While menopause can occur in a female's 40's or 50's, the average age of menstrual cycle cessation in the United States is 51 years of age. The primary hormones involved in the change are progesterone, testosterone, and estrogen. The change in the therapeutic levels of these and potentially other hormones arises from reductions and/or alterations in the ratios between the hormones.

Research suggests that changes in the level of Sex Hormone Binding Globulin (SHBG) in the bloodstream also may be a factor for consideration as SHBG bloodstream concentration is an indicator of the amount of testosterone that body tissues can use (free testosterone versus total testosterone) and as SHBG blood concentration levels are believed to increase with age, such increase would result in diminishing free testosterone even if total testosterone blood concentration levels did not decrease.

In addition to the commonly accepted symptoms of menopause, including hot flashes, mood swings, night sweats, weight gain, vaginal dryness, reduced libido, and lethargy, the changes in a female's hormone blood concentration levels result in negative physiological conditions in the body. Such negative physiological conditions include cardiovascular disease attributed to a reduction in estrogen levels, osteoporosis, and urinary incontinence attributed to a weakening of the pelvic floor muscles.

Hormone replacement therapy (HRT) is used extensively for treating hormone deficiencies due to aging or pathological effects on the endocrine system. Hormones used to combat the symptoms of menopause include progesterone, pregnenolone, estrogen, estradiol, estriol, and less commonly testosterone, DiHydroTestosterone (DHT), DeHydroEpiAndrosterone (DHEA), 7-keto DHEA, androstenedione, and androstenediol.

Other than by injection or implant, the delivery of non-derivatized hormones to mammalian organisms can be difficult or unwise from a liver toxicity perspective. If delivered orally, conventional delivery systems often result in extensive metabolism of nonderivatized hormone in the liver, which may modify or render the hormone ineffective, and cause undesirable liver stress.

For example, oral delivery of nonderivatized testosterone results in negligible blood concentration of testosterone, as substantially complete "digestion" of the hormone occurs in the stomach and liver—putting stress on the liver. In contrast to testosterone, DHEA, pregnenolone, and progesterone can be taken orally in solid or suspended form, and if enough is taken orally in solid or suspended form, achieve therapeutically effective bloodstream concentrations. Thus, for DHEA, pregnenolone, and progesterone, while greater than medically necessary dosages are needed to obtain therapeutically effective bloodstream concentrations, such bloodstream concentration may be orally obtained for these hormones with conventional delivery systems with the potential of increased systemic side effects.

The systemic side effects arising from ingesting greater than medically necessary dosages of nonderivatized DHEA, pregnenolone, or progesterone in solid or suspended conventional form is often attributable to the significant stress placed on the liver as the majority of these nonderivatized hormones are digested and not initially transferred to the bloodstream. Thus, conventional oral delivery to achieve therapeutically effective bloodstream concentrations is practically non-existent for some nonderivatized hormones, while for others, conventional oral delivery results in substantial loss of the hormone—and in either case, undesirable stress is placed on the liver at a minimum, with liver damage being possible. This situation is especially apparent for nonderivatized hormones that are not well-solubilized in water or oil.

Nonderivatized hormone including transdermal creams and gels applied to various locations on the skin, including the underarm and nasal tissues, have been attempted to bypass liver metabolism. However, transdermal creams and gels often suffer limitations from poor and variable rates of absorption, especially over time, and the potential alteration of the hormones during transport through the skin by enzymes in the skin. Furthermore, being applied to the skin, such preparations are often messy and are thus transferred to clothing and other surfaces, becoming a potential danger to other family members.

More recently nonderivatized hormone including solid pellets have been implanted under the skin. The pellets are designed to dissolve in body fluids over time, thus providing a somewhat continuous hormone dose over a 3- to 6-month period. While surgical implantation of the solid pellets is required, injection or daily transdermal application of the hormone is avoided. However, in practice the release of the hormone is often dependent on implant depth, tissue location of the solid pellets, and whether the pellets are undesirably agitated by impact or exercise. In combination, these additional variables, especially undesirable agitation arising from exercise, result in wide variance in the release profile of the hormone—commonly in the form of initial phase of over-dose and a later phase of under-dose. Furthermore, surgical removal of the implant is required if severe overdosing occurs.

Emulsions are mixtures of two or more liquids that do not solubilize. Thus, the two or more liquids do not form a solution and an identifiable interface exists between the combined liquids. Emulsions may be macroemulsions, pseudo-emulsions, nanoemulsions or microemulsions. Emulsions may be used for parenteral delivery, ocular delivery, transdermal delivery, oral delivery, and the like.

FIG. 1A represents an example nanoemulsion droplet 100 having a single wall of phospholipids (monolayer) forming a hydrophilic exterior 120 and a hydrophobic interior 110. The monolayer wall of the nanoemulsion droplet 100 is formed from a single layer of phospholipids. The outer wall 120 is water-soluble due to the phosphate functionality while the interior 110 is fat-soluble due to the alkyl functionality. FIG. 1B represents multiple of the nanoemulsion droplets 100 in a continuous phase 150.

FIG. 2A represents a microemulsion droplet 200 having a single wall of phospholipids (monolayer) forming a hydrophilic exterior 220 and a hydrophobic interior 210. As with the nanoemulsion droplets 100, the monolayer wall of the microemulsion droplet 200 is formed from a single layer of phospholipids. In relation to the represented nanoemulsion droplets 100, the microemulsion droplets 200 are substantially smaller in diameter—which is often the case for microemulsions. In fact, the diameter of the microemulsion droplets 200 is reduced to where non-polar tails 230 of the monolayer phospholipids are "crushed" into each other, thus forming a more "solid" interior hydrophobic barrier than in the case of the nanoemulsion droplets 100 as represented in FIG. 1. FIG. 2B represents multiple microemulsion droplets 200 in a continuous phase 250. Also represented in the continuous phase 250 are a few individual phospholipid molecules 260 not incorporated into the microemulsion droplets 200.

Transdermal hormone creams are typically "pseudo-emulsions" with solid granules of the nonderivatized hormone not fully solubilized in the droplets of the emulsion forming the cream. In contrast to the larger droplet macro- and pseudo-emulsions, the smaller droplets of nanoemulsions and microemulsions provide the potential to provide better hormone delivery performance than conventionally available from macro- and pseudo-emulsions for either transdermal or oral adsorption; however, microemulsions are not readily made for nonderivatized hormones.

While the high-energy mixing, in the form of pressure (including shear forces), temperature, and combinations thereof, used to form nanoemulsions may provide the smaller droplets of a microemulsion, such nanoemulsions are not thermally stable, do not form shelf-stable microemulsions, and are like a macroemulsion in that the components of the nanoemulsion eventually separate into immiscible polar and non-polar liquids. Thus, as represented in FIG. 1 and FIG. 2, nanoemulsion droplets tend to be larger than microemulsion droplets as the nanoemulsion droplets continually expand in diameter after formation until the agglomerating droplets separate from the continuous phase.

Conventionally, macroemulsions, nanoemulsions, and microemulsions have been used for either oil-soluble or water-soluble deliverables, but have had limited success in solubilizing compounds having low solubility in oil and essentially no solubility in water. Deliverables, such as many nonderivatized hormones, have low solubility in oil and essentially no solubility in water, but often have good solubility in alcohol or in mixtures of alcohol and oil. However, if the nonderivatized hormone/alcohol or nonderivatized hormone/alcohol/oil mixture is dispersed along with surfactants into water-based solutions to form an emulsion, the alcohol tends to partition into the water and the nonderivatized hormone solubility enhancement provided by the alcohol or the alcohol component of the alcohol/oil mixture is lost. This is believed attributable to the alcohol being extremely soluble in the water, in fact especially in relation to the oil if an alcohol/oil mixture is used.

Thus, the nonderivatized hormone loses significant bioavailability in such conventional emulsions, as once solubility in the alcohol or alcohol/oil mixture is lost, the nonderivatized hormone precipitates from the emulsion. In view of this disadvantage, conventionally, there has been little success in the development of oil-in-water (OIW) type microemulsions for nonderivatized hormone delivery, especially in the context of oral nonderivatized hormone delivery.

Unlike OIW emulsions (oil droplets in a water continuous phase), conventional water-in-oil emulsions (water droplets in an oil continuous phase—thus, an "invert emulsion") have been made with nonderivatized hormones. One such example is found in U.S. Pat. Pub. 2009/0069279 (abandoned) to Astruc et al. Astruc describes using nonderivatized dehydroepiandrosterone (DHEA) in an invert emulsion using non-ingestible polar glycolic and hydroglycolic solvents dispersed with silicone-based emulsifiers into an oil medium. The reference recognizes the alcohol-soluble nature of nonderivatized DHEA and the difficulty of incorporating DHEA into an OIW emulsion. However, the WIO systems of Astruc cannot be made for human consumption because of the inedible constituents, thus being limited to dermal application.

Conventional emulsion delivery systems have traditionally addressed the inability to form true oil-in-water nonderivatized hormone emulsions by first derivatizing the hormone with ester or related functionality, thus substantially enhancing the oil-solubility of the hormone. The additional alkyl groups of the derivatized hormone provide increased oil-solubility to the hormone, thus permitting the derivatized hormone to dissolve in oils for injection or to be carried by conventional oil-in-water emulsion formulations.

An issue with conventional delivery systems, including derivatized and nonderivatized hormone transdermal creams, nonderivatized hormone solid pellet implants, and derivatized hormone injectable oil preparations is that the release profile of the hormone into the bloodstream may not correlate well with the desired hormone dosing profile. Each of these conventional delivery systems is designed to eliminate the need to daily inject the nonderivatized hormone, not necessarily to provide a desired hormone bloodstream profile over time.

Injections including an excipient oil in combination with the derivatized hormone are designed to prevent having to daily inject the nonderivatized hormone by releasing the derivatized hormone from the oil excipient over time, thus permitting one or two injections per week to maintain a decaying, but somewhat level hormone concentration in the bloodstream. Solid pellet implants are designed to replace weekly or bi-weekly injections with quarterly surgical implants.

However, research indicates that such slowly decaying blood hormone concentrations over an extended time may not be desired. In fact, such injection of esterified testosterone dissolved in oil or implantation of constant release capsules may generate supraphysiological and/or constantly elevated testosterone concentrations in the blood that fail to provide the desired androgenic effects while increasing the likelihood of undesirable side effects.

There is an ongoing need for simple and efficient compositions and methods for oral delivery systems that deliver nonderivatized hormones having poor solubility in oil and essentially no solubility in water to the bloodstream. Conventional emulsion systems have traditionally had disadvantages including poor stability to cold and heat, particularly regarding maintaining the desired average droplet diameter in the emulsion, which is important for effective intra-oral delivery to the bloodstream, preventing phase separation of the oil and water components, and preventing dissociation of the deliverable from the emulsion.

In addition to these disadvantages resulting in poor bioavailability of the deliverable, thus necessitating relatively large deliverable dosages to achieve a therapeutically effective bloodstream concentration of the desired hormone, conventional oral emulsion systems also have the disadvantage of requiring too great a volume of the emulsion liquid components in relation to the mass or volume of the deliverable. These disadvantages have been especially true for the oral delivery of nonderivatized hormones to mammals, such as humans. While it is possible to positively affect menopausal symptoms with a combination of hormone creams and Kegel exercise, an oral therapy that addresses multiple menopausal symptoms would be desired.

The microemulsions and methods of the present invention overcome at least one of the disadvantages associated with conventional delivery systems by allowing the convenient and reproducible oral delivery of nonderivatized, directly solubilized hormones to the bloodstream to achieve a desired therapeutically effective bloodstream hormone concentration with a desired dosing regimen. The microemulsions and methods of the present invention advantageously affect by supporting or increasing the normal hormone levels of perimenopausal and postmenopausal women, respectively, thus improving common menopausal symptoms including hot flashes, mood swings, night sweats, weight gain, reduced libido, and lethargy.

SUMMARY

In one aspect, the invention provides a composition for reducing menopausal symptoms, the composition including an alcohol-soluble species, the alcohol-soluble species including dehydroepiandrosterone (DHEA), pregnenolone, and a polyphenol, where a ratio of the DHEA to the polyphenol is from 1:1 to 12:1 by weight; and a modified oil-in-water microemulsion including a modified oil phase and a modified polar continuous phase, where the alcohol-soluble species is solubilized in the modified oil phase, the modified oil phase including a phospholipid, a polyethylene glycol derivative, an oil, and an alcohol, and where the modified polar continuous phase comprises a sugar or sugar alcohol and water.

In another aspect of the invention, there is a method of making a modified oil-in-water microemulsion composition for reducing menopausal symptoms, the method including combining alcohol-soluble species dehydroepiandrosterone (DHEA), pregnenolone, and a polyphenol, where a ratio of the DHEA to the polyphenol is from 1:1 to 12:1 by weight, in an oil with a phospholipid, a polyethylene glycol derivative, and an alcohol to form an alcohol-lipid mixture; combining a sugar or sugar alcohol and water to form a modified polar continuous phase; and combining the alcohol-lipid mixture and the modified polar continuous phase at atmospheric pressure to form the modified oil-in-water microemulsion.

In another aspect of the invention, there is a method of intra-orally delivering alcohol-soluble species dehydroepiandrosterone, pregnenolone, and a polyphenol to the bloodstream of a subject, the method including introducing intra-orally to a subject a composition including an alcohol-soluble species, the alcohol-soluble species comprising dehydroepiandrosterone, pregnenolone, and a polyphenol, where a ratio of the dehydroepiandrosterone to the polyphenol is from 1:1 to 12:1 by weight; and a modified oil-in-water microemulsion comprising a modified oil phase and a modified polar continuous phase, where the alcohol-soluble species is solubilized in the modified oil phase, the modified oil phase comprising a phospholipid, a polyethylene glycol derivative, an oil, and an alcohol, and where the modified polar continuous phase comprises a sugar or sugar alcohol and water; delivering the dehydroepiandrosterone, pregnenolone, and the polyphenol to the bloodstream of the subject, where within 60-minutes of the introducing the composition intra-orally to the subject, a volume of the composition comprising 100 mg of the dehydroepiandrosterone provides the subject a bloodstream concentration increase from 200 to 500 ug/dL of the dehydroepiandrosterone or a metabolite of the dehydroepiandrosterone over a pre-introducing baseline bloodstream concentration of the dehydroepiandrosterone or a metabolite of the dehydroepiandrosterone in the subject.

In another aspect of the invention, there is a method of increasing bloodstream concentrations of dehydroepiandrosterone or a metabolite of the dehydroepiandrosterone and total testosterone while reducing estradiol bloodstream concentrations for a subject, the method including administering intra-orally to a subject a composition comprising: an alcohol-soluble species, the alcohol-soluble species comprising an effective amount of dehydroepiandrosterone, pregnenolone, and a polyphenol, where a ratio of the dehydroepiandrosterone to the polyphenol is from 1:1 to 12:1 by weight; and a modified oil-in-water microemulsion comprising a modified oil phase and a modified polar continuous phase, where the alcohol-soluble species is solubilized in the modified oil phase, the modified oil phase comprising a phospholipid, a polyethylene glycol derivative, an oil, and an alcohol, and where the modified polar continuous phase comprises a sugar or sugar alcohol and water; at least doubling a pre-administering baseline bloodstream concentration of dehydroepiandrosterone or a metabolite of dehydroepiandrosterone in the bloodstream of the subject within one hour of the administering to produce an elevated dehydroepiandrosterone or a metabolite of the dehydroepiandrosterone bloodstream concentration in the subject; increasing by at least 30% a pre-administering baseline bloodstream total testosterone concentration in the bloodstream of the subject within one hour of the administering to produce an elevated total testosterone bloodstream concentration in the subject; reducing by at least 12% a pre-administering baseline bloodstream estradiol concentration in the bloodstream of the subject within one hour of the administering to produce a decreased estradiol bloodstream concentration in the subject; and providing improvements in hormone-sensitive behavior to the subject.

In another aspect of the invention, there is a method of treating at least one menopausal symptom for a perimenopausal subject in need of menopausal symptom alleviation, the method including administering intra-orally to a subject a composition comprising: an alcohol-soluble species, the alcohol-soluble species comprising an effective amount of dehydroepiandrosterone, pregnenolone, and a polyphenol, where a ratio of the dehydroepiandrosterone to the polyphenol is from 1:1 to 12:1 by weight; and a modified oil-in-water microemulsion comprising a modified oil phase and a modified polar continuous phase, where the alcohol-soluble species is solubilized in the modified oil phase, the modified oil phase comprising a phospholipid, a polyethylene glycol derivative, an oil, and an alcohol, and where the modified polar continuous phase comprises a sugar or sugar alcohol and water; and reducing the severity of at least one menopausal symptom chosen from hot flashes, mood swings, night sweats, weight gain, reduced libido, lethargy, and combinations thereof.

In another aspect of the invention, there is a method of treating at least one menopausal symptom for a postmenopausal or effectively postmenopausal subject in need of menopausal symptom alleviation, the method including administering intra-orally to a subject a composition comprising: an alcohol-soluble species, the alcohol-soluble species comprising an effective amount of dehydroepiandrosterone, pregnenolone, and a polyphenol, where a ratio of the dehydroepiandrosterone to the polyphenol is from 1:1 to 12:1 by weight; and a modified oil-in-water microemulsion comprising a modified oil phase and a modified polar continuous phase, where the alcohol-soluble species is solubilized in the modified oil phase, the modified oil phase comprising a phospholipid, a polyethylene glycol derivative, an oil, and an alcohol, and where the modified polar continuous phase comprises a sugar or sugar alcohol and water; and reducing the severity of at least one menopausal symptom chosen from hot flashes, mood swings, night sweats, weight gain, vaginal dryness, reduced libido, lethargy, and combinations thereof.

Other compositions, methods, features, and advantages of the invention will be, or will become, apparent to one with skill in the art upon examination of the following figures and detailed description. It is intended that all such additional compositions, methods, features, and advantages be included within this description, be within the scope of the invention, and be protected by the claims that follow.

BRIEF DESCRIPTION OF THE DRAWINGS

The invention can be better understood with reference to the following drawings and description. The components in the figures are not necessarily to scale and are not intended to accurately represent molecules or their interactions, emphasis instead being placed upon illustrating the principles of the invention.

DETAILED DESCRIPTION

Figure 1A:
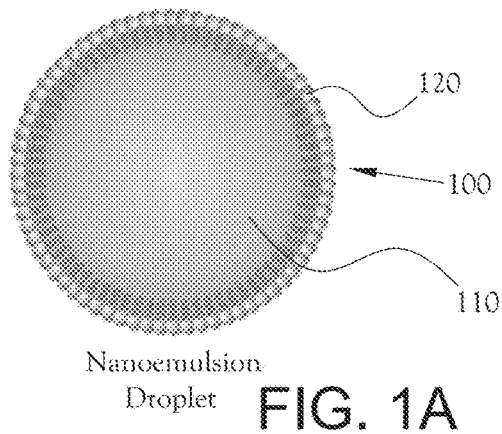
FIG. 1A represents a nanoemulsion droplet having a single wall of phospholipids (monolayer) forming a hydrophilic exterior and a hydrophobic interior.
Figure 2A:
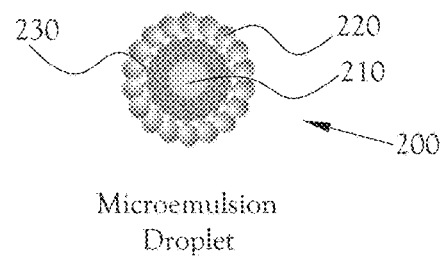
FIG. 2A represents a microemulsion droplet having a single wall of phospholipids (monolayer) forming a hydrophilic exterior and a hydrophobic interior.
Figure 1B:
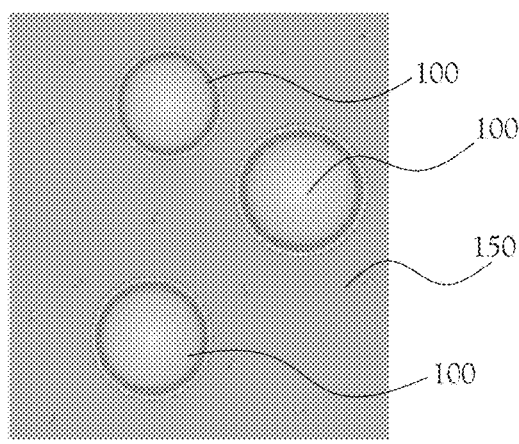
FIG. 1B represents multiple of the nanoemulsion droplets in a continuous phase.
Figure 2B:
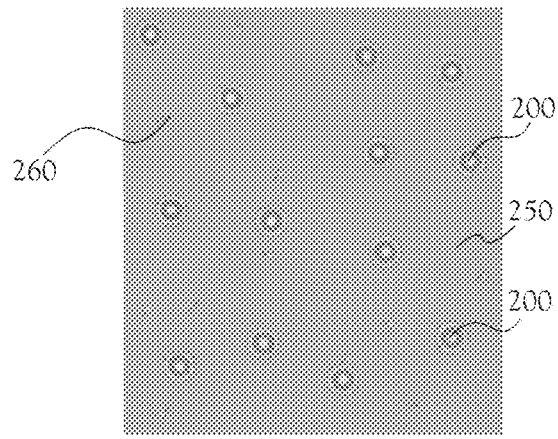
FIG. 2B represents multiple microemulsion droplets represented in a continuous phase.

Microemulsions are described where hydrophobic liquid droplets are distributed in a continuous hydrophilic liquid phase. In relation to conventional oil-in-water (OIW) microemulsions, the described microemulsions may be thought of as modified oil-in-water (MOIW) microemulsions, where both the "oil" and "water" phases of the microemulsion are modified. The oil phase droplets of the MOIW microemulsion are modified with alcohol and can solubilize alcohol-soluble species, including nonderivatized hormones. Preferably, the modified oil phase droplets of the MOIW microemulsion directly solubilize nonderivatized hormones. The oil phase droplets of the MOIW microemulsion include DHEA, pregnenolone, and a polyphenol, where a ratio of DHEA to polyphenol is from 1:1 to 12:1 by weight. Methods of supporting and/or increasing bloodstream hormone levels in perimenopausal and postmenopausal females and improving menopausal symptoms also are disclosed.

The polar continuous "water" phase of the MOIW microemulsion is modified with a sugar or sugar alcohol. Preferably, the modified polar continuous phase of the MOIW microemulsion is primarily a sugar or sugar alcohol phase. The modified oil phase droplets disperse into the modified polar continuous phase of the MOIW microemulsion.

The modified polar continuous phase is believed to allow the modified oil phase droplets of the MOIW microemulsion to incorporate and retain a high alcohol content. Thus, the modified polar continuous phase is believed to force the oil, alcohol, and alcohol-soluble species into the interior of the monolayer walls formed from a phospholipid and a polyethylene glycol derivative, thus into the hydrophobic core of the modified oil droplets, while the modified polar continuous phase including the sugar or sugar alcohol and water resides external to the monolayer.

Unlike the water continuous phase of a conventional OIW emulsion, the sugar or sugar alcohol of the modified polar continuous phase does not readily form an azeotrope with alcohol, and thus has a reduced ability to extract the alcohol from the oil droplets in relation to water. The hydrophobic portion of the monolayer wall formed from the tails of the phospholipid and in combination with the polyethylene glycol derivative in the described ratios also are believed to reduce alcohol loss from the oil droplets in relation to conventional OIW emulsions.

The retained high alcohol content of the modified oil phase droplets provided by the combination of the modified polar continuous phase with the hydrophobic monolayer is believed to increase the solubility of the alcohol-soluble species in the modified oil droplets of the MOIW microemulsion in relation to conventional OIW emulsions. This enhanced solubility of the alcohol-soluble species in the modified oil droplets of the MOIW is believed to reduce dissociation (e.g., recrystallization, precipitation, and like—thus separation) of the alcohol-soluble species from the oil droplets of the MOIW microemulsion during storage thus making the MOIW microemulsion a shelf-stable MOIW microemulsion that preferably is visually clear and more preferably transparent.

In the MOIW microemulsion, modified oil phase droplets including the alcohol-soluble species have an average droplet diameter of 1 to 100 nanometers and a preferable average droplet diameter of 5 to 50 nanometers. More preferably, the modified oil phase droplets of the MOIW microemulsion have an average droplet diameter from 7 to 30 nanometers.

The alcohol-soluble species of the MOIW microemulsions is a deliverable that may be delivered trans-mucosal (e.g., oral, intranasal, vaginal, or rectal) or transdermally via the MOIW microemulsion. However, transdermal use is less preferred. In addition to directly solubilized nonderivatized hormones, derivatized hormones, such as esterified hormones, may be included in the MOIW microemulsion, in the event a greater hormone density in the MOIW microemulsion is desired.

The MOIW microemulsion can provide the uptake of the alcohol-soluble species to the bloodstream of a mammal through the oral and gastric mucosa, as well as transdermally through the skin. When the alcohol-soluble species is a nonderivatized hormone, such uptake to the bloodstream may be accomplished without the substantial modification and/or transformation of the nonderivatized hormone that has plagued prior, conventional OIW microemulsion attempts and without substantial stress on the liver.

Preferably, the MOIW microemulsion including the alcohol-soluble species is ingestible and edible. Thus, unlike suggested in the literature regarding WIO microemulsions, the described MOIW microemulsions unexpectedly provide therapeutically effective bloodstream concentrations of nonderivatized hormones via oral delivery. Additionally, the ability of the MOIW microemulsion to deliver nonderivatized hormone alcohol-soluble species rapidly, efficiently, and without substantial modification and/or transformation via intra-oral delivery provides for dosing regimens not practical with conventional delivery systems.

For the emulsion constituents, the MOIW microemulsion preferably includes a ratio of phospholipid, to oil, to polyethylene glycol derivative, to alcohol, to sugar or sugar alcohol, and to water of 1:2:0.6-3.3:4:9:1-3 by weight, with deviations up to 20% by weight being included, and with deviations up to 10% by weight being more preferred, thus 1:2:0.6-3.3:4:9:1-3±20% by weight or 1:2:0.6-3.3:4:9:1-3±10% preferred by weight. The MOIW microemulsion also may include a ratio of the phospholipid, to the oil, to the polyethylene glycol derivative, to the alcohol, to the sugar or sugar alcohol, and to the water from 1:2:0.6-3.3:4:10.5:1-1.6±20% by weight.

The alcohol-soluble species deliverables are preferably included in the MOIW microemulsion at a ratio of oil to alcohol-soluble species of 1:0.02 to 1:0.5 by weight, with a ratio of oil to alcohol-soluble species of 1:0.1 to 1:0.3 by weight being preferred with deviations up to 10% by weight being included, and with deviations up to 5% by weight being more preferred, thus 1:0.02 to 1:0.3±10% by weight or 1:0.02 to 1:0.3±5% preferred by weight.

Figure 3:
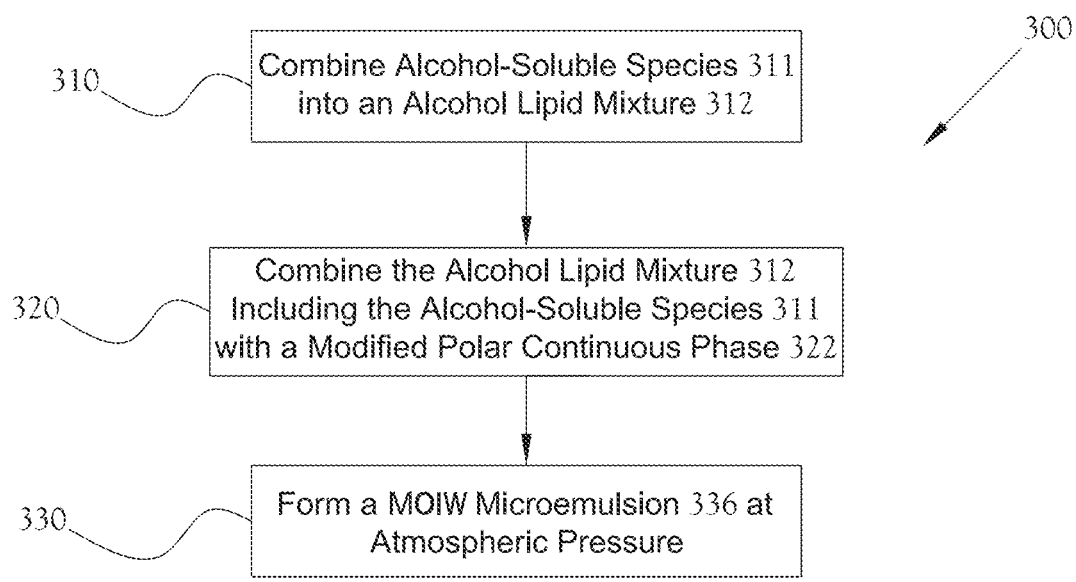
FIG. 3 represents a method of making a MOIW microemulsion including an alcohol-soluble species.

FIG. 3 represents a method 300 of making a MOIW microemulsion 336 including an alcohol-soluble species 311. The MOIW microemulsion 336 can orally deliver therapeutically effective concentrations of the alcohol-soluble species 311 to the bloodstream of a living mammal.

In 310, the alcohol-soluble species 311 is combined into an alcohol-lipid mixture 312 including a polyethylene glycol derivative, a phospholipid, an oil, and an alcohol. In 320, the alcohol-lipid mixture 312 including the alcohol-soluble species 311 is combined with a modified polar continuous phase 322 including the sugar or sugar alcohol and water. The alcohol-lipid mixture 312 including the alcohol-soluble species 311 may be considered a modified oil phase dispersed in the modified polar continuous phase 322, which may be thought of as a modified water phase.

In 330, the MOIW microemulsion 336 including the alcohol-soluble species 311 is formed by mixing at atmospheric pressure. Unlike in nanoemulsions, the MOIW microemulsion 336 may be formed at atmospheric pressure without needing the high-energy of elevated pressures and/or shear forces to form. Although the MOIW microemulsion 336 could be formed using elevated pressure and/or shear forces as used in forming nanoemulsions, the result eventually will be the MOIW microemulsion 336, as unlike in a nanoemulsion that begins the dissociation process after formation—even if dissociation is very slow, the MOIW microemulsion 336 is thermally stable at room temperature and pressure after formation. Thus, formation of the MOIW microemulsion 336 dispenses with the undesirable use of high-energy elevated pressures and/or shear forces during formation, and is shelf-stable after formation.

While the method 300 represents the alcohol-soluble species 311 first being combined with the alcohol-lipid mixture 312, the alcohol-lipid mixture 312 and the polar continuous phase 322 may first be combined and the alcohol-soluble species 311 then added to form the MOIW microemulsion 336 (not shown). This step rearrangement is possible as the modified oil and modified polar continuous phases will "self-assemble" droplets including the alcohol-soluble species to form the MOIW microemulsion 336 at atmospheric pressure.

The alcohol-soluble species 311 includes nonderivatized hormones, polyphenols, plant sterols, and amines. The alcohol-soluble species is solubilized in the droplets of the MOIW microemulsion 336, thus in the alcohol-lipid mixture 312. Preferably, the alcohol-soluble species 311 constitutes from 0.2% to 5% of the MOIW microemulsion 336 by weight. However, to provide a visually clear emulsion with the widest range of alcohol-soluble species, weight percentages of the alcohol-soluble species 311 from 0.2% to 4% are preferred, with weight percentages from 0.25% to 3.5% being more preferred to provide transparency. For the nonderivatized hormones DHEA and pregnenolone with chrysin, weight percentages of the alcohol-soluble species 311 in the MOIW microemulsion 336 from 0.2% to 3.5% are readily achieved, with weight percentages from 0.25% to 3% being readily achieved while maintaining a shelf-stable MOIW microemulsion that is transparent.

Alcohol-soluble nonderivatized hormones for use in the MOIW microemulsion 336 include dehydroepiandrosterone (3-beta-hydroxyandrosteron-5-en-17-one) (DHEA), 7-keto DHEA, pregnenolone, progesterone, testosterone, dihydrotestosterone (DHT), estradiol, estrone, estriol, androstenedione (AD), androstenediol, and cortisol. More preferred nonderivatized hormones for use in the MOIW microemulsion 336 are DHEA and pregnenolone. Preferable alcohol-soluble polyphenols for use in the MOIW microemulsion 336 include chrysin, hesperetin, and apigenin, with chrysin being more preferred and apigenin being less preferred. Preferable alcohol-soluble plant sterols for use in the MOIW microemulsion 336 include tribulus terrestris and yohimbe, while preferable alcohol-soluble amines for use in the MOIW microemulsion 336 include diindolylmethane (DIM).

When the MOIW microemulsion 336 is formulated as a therapy to advantageously affect common menopausal symptoms by supporting or increasing the hormone levels of perimenopausal and postmenopausal subjects, respectively, the MOIW microemulsion 336 preferably includes DHEA, pregnenolone, chrysin, and DIM. The DHEA may be present in the MOIW microemulsion 336 from 1% to 4% on a weight basis. Preferably, DHEA constitutes from 1.8% to 2.5% of the MOIW microemulsion 336 on a weight basis. The pregnenolone may be present in the MOIW microemulsion 336 from 0.05% to 1% on a weight basis. Preferably, the pregnenolone constitutes from 0.15% to 1% of the MOIW microemulsion 336 on a weight basis. Chrysin may be present in the MOIW microemulsion 336 from 0.05% to 2.5% on a weight basis. Preferably, the chrysin constitutes from 0.1% to 1% of the MOIW microemulsion 336 on a weight basis. The DIM may be present in the MOIW microemulsion 336 from 0.05% to 1% on a weight basis. Preferably, the DIM constitutes from 0.15% to 1% of the MOIW microemulsion 336 on a weight basis.

The ratio in the MOIW microemulsion 336 of DHEA to pregnenolone to chrysin to DIM is preferably 10:1-3:1-10:1±20% by weight, or 10:1-3:1-3:1±10% more preferred by weight, when DIM is included. The inclusion of the polyphenol chrysin with the DHEA and the ratio of DHEA to the polyphenol chrysin is believed a significant factor in the unexpected ability of the MOIW microemulsion 336 to increase blood testosterone levels in response to DHEA without the expected concurrent increase in blood estradiol levels as addressed in the Examples. The weight ratio of DHEA to chrysin in the MOIW microemulsion 336 preferably is from 1:1 to 12:1, with a ratio of 4:1 to 12:1 being more preferred, and a ratio of 10:1±20% being more preferred at present.

The alcohol lipid mixture 312 may include an oil-soluble deliverable specie or species that is more soluble in oil than the alcohol-soluble species 311. Such oil-soluble deliverables are solubilized in the modified oil phase droplets of the MOIW microemulsion, thus in the alcohol lipid mixture 312 with the alcohol-soluble species 311.

Oil-soluble deliverable species include derivatized hormones, cannabis extracts, and terpenes. Preferable derivatized hormones include testosterone-propionate, testosterone-cypionate, testosterone-enanthate, and testosterone-phenylpropionate. More preferred derivatized hormones are testosterone-propionate and testosterone-cypionate. At present, the most preferred derivatized hormone is testosterone-cypionate. Preferable cannabis extracts include cannabidiol (CBD), tetrahydrocannabinol (THC), and other cannabinoids including cannabinol (CBN), cannabigerol (CBG), tetrahydrocannabivarin (THCV), cannabidivarin (CBDV), and cannabichromene (CBC). Preferable terpenes include monoterpenes (incorporate two isoprene units and have the molecular formula $C_{10}H_{16}$), monoterpenoids, diterpenes (incorporate four isoprene units and often have the molecular formula $C_{20}H_{32}$), and diterpenoids. Preferable terpenes include limonene, pinene, linalool, beta-caryophyllene, retinol, phytol, myrcene, humulene, ocimene, terpinolene, geraniol, and geranylgeraniol. Terpenes have diverse applicability, for example humulene has been used in folk medicine to positively affect menopausal symptoms.

The modified polar continuous phase 322 may include a water-soluble deliverable specie or species that is more soluble in water than the alcohol-soluble species 311. Such water-soluble deliverables are solubilized in the modified polar continuous phase 322 of the MOIW microemulsion 336. Thus, in the carrier liquid of the MOIW microemulsion 336. Preferable water-soluble deliverables include Korean fermented ginseng paste extract, and flavorings. Additional water-soluble deliverables include Ren Shen (Red/Chinese ginseng), St. John's wort, red clover, linseed, evening primrose, valerian, passionflower, lemon balm, hops, polyamines, spermine, spermidine, methionine, ornithine, and citrulline.

Maca extract and Dang Gui are herbal extracts including alcohol-soluble polyphenol constituents and water-soluble constituents, thus being considered a "hybrid" deliverable for solubility purposes. Thus, as addressed in the Examples, they preferably are added to the modified polar continuous phase 322 during formation of the MOIW microemulsion 336, but have constituents that are not solubilized by the modified polar continuous phase 322. When the alcohol lipid mixture 312 is combined with the modified polar continuous phase 322 the alcohol-soluble constituents of the Maca extract and Dang Gui that are insoluble in the modified polar continuous phase 322 are believed to enter the droplets of the alcohol lipid mixture 312 and thus become solubilized by the droplets during formation of the MOIW microemulsion 336 at atmospheric pressure.

The phospholipid and the polyethylene glycol derivative in combination form the boundary between the modified polar continuous phase and the interior of the modified oil phase droplets of the MOIW microemulsion 336. To maintain the desired alcohol concentration within the droplets, thus reducing the likelihood of losing the alcohol to the modified polar continuous phase and the associated dissociation of the alcohol-soluble species from the droplets, the phospholipid, polyethylene glycol derivative, and the ratio between the two are important, as previously discussed.

The phospholipid of the alcohol-lipid mixture 312 is a glycerophospholipid preferably isolated from lecithin. As the phospholipid is preferably a lecithin isolate, the named isolates preferably include 80% (w/w) of the specified phospholipid with the remaining constituents being one or more additional phospholipids isolated from the lecithin or other lecithin isolates. Preferred phospholipid lecithin isolates include phosphatidylcholine (PC), phosphatidylethanolamine (PE), phosphatidylinositol (PI), ceramide phosphoryl ethanolamine (Cer-PE), ceramide phosphoryl choline (SPH), and combinations thereof, with PC, PE, and combinations thereof being more preferred. However, all phospholipid lecithin isolates are unexpectedly not interchangeable in forming visually clear, shelf-stable MOIW microemulsions, as the phosphatidylserine (PS) and phosphatic acid (PA) isolates are not useful when both visually clear and shelf-stable MOIW microemulsions are desired. When the alcohol-soluble species 311 includes nonderivatized DHEA, nonderivatized pregnenolone, and chrysin, and a shelf-stable, visually clear, and transparent MOIW microemulsion is desired, the phospholipid is preferably PC.

The phospholipid may be present in the MOIW microemulsion 336 from 3% to 10% on a weight basis. Preferably, the phospholipid constitutes from 4% to 8% of the MOIW microemulsion 336 on a weight basis. When the alcohol-soluble species includes nonderivatized DHEA, nonderivatized pregnenolone, and chrysin, the phospholipid constitutes from 4% to 6% of the MOIW microemulsion 336 on a weight basis.

The polyethylene glycol derivative of the alcohol-lipid mixture 312 may be a polyethylene glycol modified vitamin E, such as tocopheryl polyethylene glycol succinate 1000 (TPGS), polysorbate 40, polysorbate 60, or polysorbate 80. Preferably, the polyethylene glycol derivate is TPGS, polysorbate 60, or polysorbate 80. More preferably, the polyethylene glycol derivative is TPGS or polysorbate 80. When the alcohol-soluble species includes nonderivatized DHEA, nonderivatized pregnenolone, and chrysin, the preferred polyethylene glycol derivative is TPGS.

The polyethylene glycol derivative may be present in the MOIW microemulsion 336 from 5% to 14% on a weight basis. Preferably, the polyethylene glycol derivative constitutes from 6% to 12% of the MOIW microemulsion 336 on a weight basis. When the alcohol-soluble species includes nonderivatized DHEA, nonderivatized pregnenolone, and chrysin, the polyethylene glycol derivative constitutes from 9% to 11% of the MOIW microemulsion 336 on a weight basis.

TPGS, polysorbate 20, polysorbate 40, polysorbate 60, and polysorbate 80 are often thought of as interchangeable surfactants. This was determined not to be the case in the formation of the described MOIW microemulsion 336 when a shelf-stable, visually clear MOIW microemulsion is desired.

When used in conjunction with the phospholipid, TPGS resulted in shelf-stable, visually clear MOIW microemulsions at phospholipid to TPGS ratios of approximately 1:0.4 to 1:4 by weight, with preferred shelf-stable MOIW microemulsions being formed at ratios of 1:1.6 to 1:4 by weight.

When used in conjunction with the phospholipid, polysorbate 20 did not form visually clear, shelf-stable microemulsions.

When used in combination with the phospholipid, polysorbate 40 resulted in shelf-stable, visually clear MOIW microemulsions at PC to polysorbate 40 ratios of approximately 1:2 to 1:3 by weight, with preferred shelf-stable, transparent MOIW microemulsions being formed at a ratio of approximately 1:3 by weight. When used in combination with the phospholipid, polysorbate 60 resulted in shelf-stable, visually clear MOIW microemulsions at phospholipid to polysorbate 60 ratios of approximately 1:2 to 1:4 by weight, with preferred shelf-stable, visually clear MOIW microemulsions being formed at a ratio of 1:2 to 1:3 by weight. When used in combination with the phospholipid, polysorbate 80 resulted in shelf-stable, visually clear MOIW microemulsions at phospholipid to polysorbate 80 ratios of approximately 1:0.4 to 1:4 by weight, with preferred shelf-stable, transparent MOIW microemulsions being formed at a ratio of 1:0.6 to 1:4 by weight.

These results establish that the multiple polyethylene glycol derivatives are unexpectedly not interchangeable in forming shelf-stable, visually clear MOIW microemulsions including nonderivatized DHEA, nonderivatized pregnenolone, and chrysin. In fact, polysorbate 20 is not useful. Furthermore, TPGS and polysorbate 80 are the preferred polyethylene glycol derivatives as in combination with the phospholipid, they provide the desired shelf-stable, visually clear, and transparent MOIW microemulsions over the widest alcohol-soluble species concentration range.

The alcohol-lipid mixture 312 preferably includes at least one oil held within the phospholipid/polyethylene glycol derivative monolayer. The oil may be a medium-chain triglyceride (MCT) oil, a citrus oil, and combinations thereof. Preferable MCT oils include caproic acid (hexanoic acid), caprylic acid (octanoic acid), capric acid (decanoic acid), lauric acid (dodecanoic acid), and combinations thereof. More preferred MCT oils include caprylic acid, capric acid, and combinations thereof. Preferred citrus oils include orange oil, lemon oil, and combinations thereof. When the alcohol-soluble species includes nonderivatized DHEA, nonderivatized pregnenolone, and chrysin, the oil is preferably a combination of triglycerides whose fatty acids have an aliphatic tail from 8 to 12 carbon atoms in length, as using 100% C8 caprylic acid will result in the MOIW microemulsion not being visually clear.

The oil may be present in the MOIW microemulsion 336 from 5% to 15% on a weight basis. Preferably, the oil constitutes from 7% to 13% of the MOIW microemulsion 336 on a weight basis. When the alcohol-soluble species includes nonderivatized DHEA, nonderivatized pregnenolone, and chrysin, the oil constitutes from 9% to 11% of the MOIW microemulsion 336 on a weight basis.

The MOIW microemulsion 336 includes at least one alcohol. The preferable alcohol is food grade as the MOIW microemulsion 336 is preferably edible. Preferably, the alcohol is ethanol, with USP food grade 190 proof (95% ethanol, 5% water by weight) ethanol being more preferred. Alcohol water contents exceeding 10% are less preferred, as then the additional water should be considered in relation to the total water content of the MOIW microemulsion 336 to prevent dissociation of the alcohol-soluble species from the modified oil phase droplets as discussed further below.

The alcohol may be present in the MOIW microemulsion 336 from 5% to 25% on a weight basis. Preferably, the alcohol constitutes from 10% to 20% of the MOIW microemulsion 336 on a weight basis. When the alcohol-soluble species includes nonderivatized DHEA, nonderivatized pregnenolone, and chrysin, the alcohol constitutes from 17% to 23% of the MOIW microemulsion 336 on a weight basis.

The modified oil phase droplets of the MOIW microemulsion 336 may be considered to have a high alcohol content, thus having an oil to alcohol ratio of from 1:1.5 to 1:4, preferably from 1:1.5 to 1:3 by weight.

The modified polar continuous phase 322 includes a sugar or sugar alcohol and water. The term "sugar or sugar alcohol" means a sugar or a sugar alcohol preferably including from 3 to 12 carbon atoms that is a liquid at room temperature and pressure or soluble in water at room temperature and pressure. Preferable sugars include sucrose, cane sugar, and pure maple syrup, with pure maple syrup being preferred due to the inclusion of tree resins. Preferable sugar alcohols have from 3 to 6 carbon atoms and include glycerol (glycerin).

While one could expect additional sugar alcohols, including xylitol, erythritol, mannitol, and sorbitol to be useful in forming the MOIW microemulsion 336, all sugar alcohols are unexpectedly not interchangeable in forming shelf-stable, visually clear MOIW microemulsions, as xylitol, erythritol, mannitol, and sorbitol are not useful when both shelf-stable and visually clear MOIW microemulsions are desired. Thus, preferred sugar or sugar alcohols include sucrose, cane sugar, pure maple syrup, glycerol, and combinations thereof. More preferred sugar or sugar alcohols include pure maple syrup, glycerol, and combinations thereof. Presently, the most preferred sugar or sugar alcohol is glycerol when transparent MOIW microemulsions are desired.

When the sugar or sugar alcohol is glycerol, the ratio of glycerol to water is from 12:1 to 8:1 by weight, preferably 10:1 by weight with deviations up to 20% by weight being included, and with deviations up to 10% by weight being more preferred, thus 10:1±20% by weight or 10:1±10% preferred by weight. When the sugar or sugar alcohol is pure maple syrup, sucrose, or cane sugar, and water is present in the syrup or used to solubilize the sucrose or cane sugar, this additional water becomes part of the water constituent of the MOIW microemulsion 336 and is thus included in the sugar or sugar alcohol to water weight ratio as water.

When the sugar or sugar alcohol is glycerol, the glycerol may be present in the MOIW microemulsion 336 from 30% to 50% on a weight basis with a total water content of 5% to 15% by weight. Preferably, glycerol constitutes from 35% to 46% of the MOIW microemulsion 336 on a weight basis with a total water content of 5% to 15% by weight. When the alcohol-soluble species includes nonderivatized DHEA, nonderivatized pregnenolone, and chrysin, the glycerol constitutes from 38% to 43% of the MOIW microemulsion 336 on a weight basis.

The water of the polar continuous phase 332 is present in the MOIW microemulsion 336 from 2% to 10% on a weight basis. Preferably, water is present from 4% to 10% on a weight basis in the MOIW microemulsion 336. More preferably, water may be present in the MOIW microemulsion 336 from 4% to 8% on a weight basis. When the alcohol-soluble species includes nonderivatized DHEA, nonderivatized pregnenolone, and chrysin, water is present in the MOIW microemulsion 336 from 5% to 8% on a weight basis. Water contents exceeding 12% and, in some instances, exceeding 10% up to the 12% limit in the MOIW microemulsion 336 on a weight basis may result in dissociation of the alcohol-soluble species from the droplets, and thus non-shelf-stable MOIW microemulsions resulting from an excessive loss of the alcohol from the droplets.

While not shown in FIG. 3, the oil may be reduced to the point of omission from the method 300 if the amount of the sugar or sugar alcohol is simultaneously increased. For example, if the MOIW microemulsion 336 is formed with 5% oil by weight and 56% sugar alcohol by weight, a MOIW microemulsion could be formed with 3% oil by weight and 58% sugar or sugar alcohol by weight or with 0% oil and up to 63% sugar or sugar alcohol by weight. When a MOIW microemulsion includes less than 5% oil, 53% to 63% sugar or sugar alcohol by weight is preferred. When a MOIW microemulsion includes 0% oil, 57% to 63% sugar or sugar alcohol by weight is preferred.

While such "reduced oil" MOIW microemulsions will be visually clear and shelf-stable, the average droplet diameters will be on the upper end of the scale, thus closer to 100 nanometers, and thus will be less effective at intra-oral delivery of the deliverable. Such a "reduced oil" MOIW microemulsion preferably has a ratio of phospholipid, to polyethylene glycol derivative, to alcohol, to sugar or sugar alcohol, and to water of 1:0.6-3.3:4:9:1-3 by weight, with deviations up to 20% by weight being included, and with deviations up to 10% by weight being more preferred, thus 1:0.6-3.3:4:9:1-3±20% by weight or 1:0.6-3.3:4:9:1-3±10% preferred by weight.

The MOIW microemulsion 336 may optionally include other ingredients or "adjuvants" that are chemically compatible with the alcohol-soluble species and do not substantially interfere with the separation between the modified oil and water phases of the MOIW microemulsion. Such adjuvants may include hydrophilic or lipophilic gelling agents, thickeners, preservatives, antioxidants, electrolytes, perfumes, fillers, and pigments. Other adjuvants may be used in the MOIW microemulsion.

For a reduction in the symptoms associated with menopause, a MOIW microemulsion including a therapeutically effective DHEA to chrysin ratio is preferably intra-orally administered to a perimenopausal or postmenopausal subject by a daily dose on an empty stomach, preferably ante meridiem. This daily dose preferably is an approximate 5 mL volume of the MOIW microemulsion, depending on the DHEA and chrysin concentration provided by the MOIW microemulsion. However, if gastrointestinal sensitivity to the single dose is observed, the dose may be divided into two half-doses and administered twice daily, preferably ante meridiem and post meridiem, such as before bedtime.

After an approximately 21- to 35-day administration period, the daily dose is preferably reduced to a half-dose and the patient's symptoms monitored for an additional 21- to 35-day administration period to determine if the improvement in menopausal symptoms remain. The 35-day period would include and thus compensate for changes in hormone levels arising from menstruation, and is thus preferred. If no increase in symptom severity occurs, the patient is maintained on the daily half-dose, while if the severity of symptoms increases, dosing is returned to the daily dose. If the patient is perimenopausal, and an increase in symptom severity is not observed with the decrease to a daily half-dose daily, intermittent half-dosing preferably is used with a three week on, two week off regimen. If an increase in symptom severity occurs in response to the intermittent half-dosing, dosing is returned to the daily half-dose. While such an intermittent dosing regimen may be attempted with a postmenopausal patient, it is less likely to maintain the desired therapeutic effect regarding menopausal symptom reduction than for a perimenopausal patient.

The following examples are provided to illustrate one or more preferred embodiments of the invention. Numerous variations can be made to the following examples that lie within the scope of the invention.

EXAMPLES

Example 1: Constituents of a MOIW Microemulsion Including the Nonderivatized Hormones DHEA and Pregnenolone, the Polyphenol Chrysin, and DIM A MOIW microemulsion was prepared having a 5 mL total volume. The MOIW microemulsion included approximately 100 mg of the nonderivatized hormone DHEA, approximately 10 mg of the nonderivatized hormone pregnenolone, approximately 10 mg of chrysin, and approximately 10 mg of DIM. The MOIW microemulsion also included from 30 mg to 100 mg of PC, from 150 mg to 250 mg of ethanol, from 350 mg to 600 mg of glycerin, and from 50 mg to 150 mg of medium chain triglycerides. TPGS was included to provide the desired physical structures in the MOIW microemulsion.

In addition to these ingredients, the MOIW microemulsion included enough water to provide a total emulsion volume of 5 mL. The water included approximately 280 mg to 315 mg of Maca extract, approximately 190 mg to 230 mg of Dang Gui, and approximately 35 mg to 55 mg of the fermented ginseng paste extract in addition to flavorings.

Example 2: A Method of Making a MOIW Microemulsion Including the Nonderivatized Hormones DHEA and Pregnenolone, Chrysin, and DIM Approximately 100 mg of nonderivatized DHEA, approximately 10 mg of the nonderivatized hormone pregnenolone, approximately 10 mg of chrysin, and approximately 10 mg of DIM were combined in MCT oil and then combined with TPGS, PC, glycerin, and ethanol in water. The water included the water-soluble deliverables Maca extract (300 mg), Dang Gui (200 mg), and the fermented ginseng paste extract (50 mg) in addition to flavorings. The combination was then mixed at atmospheric pressure to form a MOIW microemulsion including the nonderivatized hormones DHEA and pregnenolone having a total volume of 5 mL.

Example 3: Bioavailability Uptake and Duration for Intra-Oral Delivery of Nonderivatized DHEA Nonderivatized DHEA (100 mg per 5 mL of MOIW microemulsion) was incorporated into a MOIW microemulsion in accord with Example 2. On an empty stomach, a female subject placed 2 mL of the MOIW microemulsion including the nonderivatized DHEA under her tongue. She held the MOIW microemulsion under the tongue for approximately 30 seconds to 2 minutes before swallowing the MOIW microemulsion.

Blood samples were collected before the MOIW microemulsion was administered and at varying time intervals between approximately 20- and 180-minutes after administration of the MOIW microemulsion. The collected blood samples were analyzed for the blood serum concentration of DHEA-s, the sulfated congener of DHEA which is an initial product produced by the body from metabolizing DHEA.

Figure 4:
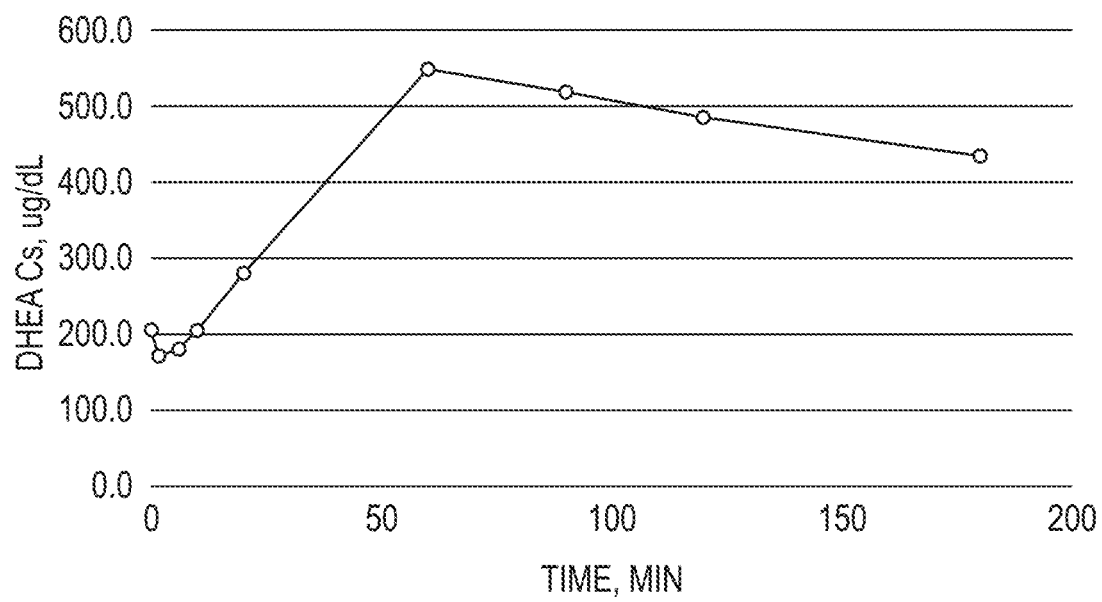
FIG. 4 provides the results of the bioavailability uptake and duration analysis in graphical form for intra-oral dosing of DHEA to a female subject.

FIG. 4 provides the results of the bioavailability uptake and duration analysis in graphical form for intra-oral dosing of DHEA to a female subject. The blood serum DHEA-s concentration of the female subject reached a maximum approximately 60-minutes post-introduction, and maintained a near level blood serum concentration until the 180-minute study end time. Prior to MOIW microemulsion introduction to the subject, thus at a baseline bloodstream concentration, the subject's DHEA-s blood serum concentration was at approximately 200 micrograms (ug) per deciliter (dL) of blood, thus the increase in DHEA-s to greater than 500 ug/dL in response to introduction of the MOIW microemulsion over the timeframe of the study for the subject was significant. As the nonderivatized hormone pregnenolone, chrysin, and DIM are also carried by the modified oil phase of the MOIW microemulsion, a similar delivery profile for these emulsion constituents into the subject's bloodstream is expected.

Example 4: Effect of DHEA and Chrysin in MOIW Microemulsions on Female Subject Blood DHEA-s, Testosterone, and Estradiol Levels Nonderivatized DHEA was incorporated into a first MOIW microemulsion (20 mg DHEA per 1 mL) and chrysin (20 mg chrysin per 2 mL) was incorporated into a second MOIW microemulsion. On an empty stomach, a female subject placed a 1 mL volume of the DHEA MOIW microemulsion under her tongue including 20 mg of DHEA. The same female subject also placed a 2 mL volume of the chrysin MOIW microemulsion under her tongue including 20 mg of chrysin to provide co-administration of the DHEA and the chrysin. Thus, the total administered volume of MOIW microemulsion was 3 mL with a DHEA to chrysin weight ratio of 1:1 from the co-administration.

The subject held the MOIW microemulsions under her tongue for approximately 30 seconds to 2 minutes before swallowing. Blood samples were collected from the subject before the MOIW microemulsions were administered and at varying time intervals between approximately 20 and 180 minutes after intra-oral consumption of the MOIW microemulsions. The collected blood samples were analyzed for the blood serum concentration of DHEA-s, Total Testosterone, and Estradiol (E2).

Figure 5:
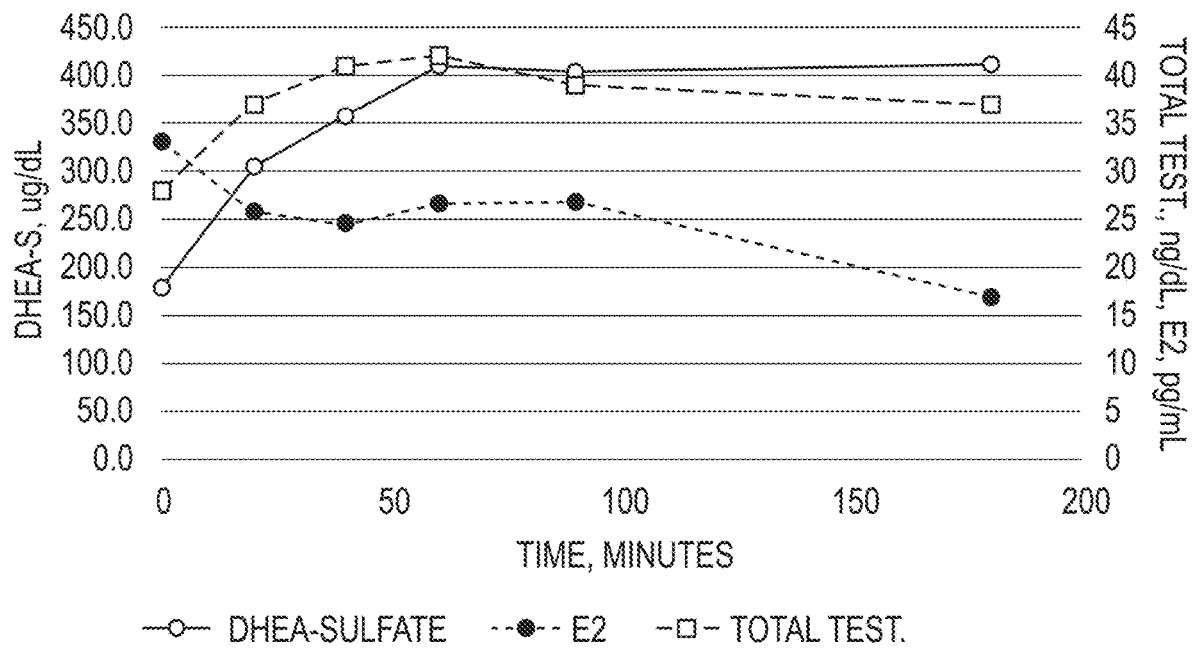
FIG. 5 provides the blood concentrations of DHEA-s, Testosterone, and Estradiol of the female subject over 180-minutes in graphical form for the 1:1 DHEA to chrysin ratio.

Table 1 below provides the blood concentrations of DHEA-s, total testosterone, and estradiol of the subject over 180-minutes in response to the 1:1 DHEA to chrysin ratio. FIG. 5 provides the blood concentrations of DHEA-s, Testosterone, and Estradiol of the female subject over 180-minutes in graphical form for the 1:1 DHEA to chrysin ratio.

TABLE 1

| | Time in Minutes | | | | | |
|---|---|---|---|---|---|---|
| | 0 | 20 | 40 | 60 | 80 | 180 |
| DHEA-s (ug/dL) | 180 | 300 | 355 | 410 | 400 | 410 |
| Total Testosterone (ng/dL) | 28 | 37 | 41 | 42 | 40 | 37 |
| Estradiol (pg/mL) | 34 | 26 | 25 | 27 | 27 | 17 |

The co-administered MOIW microemulsions increased the blood serum DHEA-s and total testosterone concentrations to a maximum approximately 60-minutes post intra-oral consumption, and maintained a near level blood serum concentration of both until the 180-minute study end time. Baseline DHEA-s concentration for the subject was at approximately 180 microgram (ug) per deciliter (dL) of blood, thus the increase in DHEA-s to approximately 400 ug/dL over the 60- to 180-minute timeframe of the study in response to the MOIW microemulsions was significant.

Unlike the expected approximately similar increase in total testosterone and estradiol blood concentrations in response to DHEA bloodstream delivery by the MOIW microemulsions, unexpectedly the estradiol serum concentration in relation to the total testosterone serum concentration underwent a significant decrease. Thus, unlike DHEA-s and total testosterone, which increased substantially from their original levels (an approximate 97% increase at 60-minutes for DHEA-s and an approximate 50% increase at 60-minutes for Total Testosterone), estradiol underwent an approximately 20% decrease at 60-minutes, and a very significant approximately 50% decrease 180-minutes after administration of the MOIW microemulsion. Thus, the approximate 50% increase for total testosterone in combination with the 20% decrease in estradiol gives an approximately 70% change between blood constituents that would be expected to respond similarly to heightened DHEA-s serum concentrations.

Example 5: Perimenopausal Subject Blood Concentration Hormone Level Changes in Response to Different MOIW Microemulsion Dosing Over Time Table 2 below provides blood concentration hormone levels for a perimenopausal female prior to intra-oral administration of the MOIW microemulsion of Example 2 excluding Dan Gui and the fermented ginseng paste, after a half-dose (2.5 mL) daily dosing period that is switched to a dose (5 mL) daily period, and after an approximate 60-day off period, followed by a dose period. Excluded from the table below was data from another study where the MOIW microemulsion of Example 2 excluded the DIM, Maca extract, Dan Gui, and the fermented ginseng paste. However, this formulation proved less effective at advantageously reducing menopausal symptoms.

TABLE 2

| Blood Hormone Concentration | Before OIW Microemulsion | On Half-Dose | On Dose | During ~60-Day Off | On Dose |
|---|---|---|---|---|---|
| DHEA-s (ug/dL) | 68 | 271 | 513 | 94 | 554 |
| Estradiol (pg/mL) | 74 | 25 | 37 | 27 | 17 |
| Total Testosterone (ng/dL) | 12 | 27 | 86 | 17 | 59 |
| SHBG (nmol/L) | 120 | 105 | 103 | 121 | |
| Calculated Free Testosterone (ng/dL) | 0.08 | 0.2 | 0.7 | 0.1 | |
| Ratio of Free Testosterone to Estradiol | 1:925 | 1:125 | 1:53 | 1:270 | |

The ability of the MOIW microemulsion to support or increase total testosterone serum levels while simultaneously stabilizing or reducing estradiol serum levels was established in a perimenopausal subject. The MOIW microemulsion was observed to have a supporting effect during the approximately 60-day off period as the blood concentration levels maintained were somewhat elevated (DHEA-s, total testosterone) or reduced (estradiol) in relation to the before administration levels.

A therapeutically effective free testosterone to estradiol ratio in the menopausal symptom context was provided by the MOIW microemulsion, with a therapeutically effective free testosterone to estradiol ratio believed to start at approximately 1:150 for some perimenopausal patients, but with ratios of free testosterone to estradiol less than 1:100 being preferred and with ratios of free testosterone to estradiol less than 1:80 being more preferred due to their "all patient and symptom applicability", especially in the context of perimenopausal patients.

As SHBG serum levels were monitored in this study, free testosterone blood levels could be determined. While total testosterone is a relevant value, more important is the free testosterone blood concentration available for use by the body. The MOIW microemulsion established the ability to reduce SHBG blood levels while simultaneously and significantly increasing total and thus free testosterone levels. The ability of the MOIW microemulsion to suppress SHBG levels was not observed during the 60-day off period.

Of greatest interest are the alterations in free testosterone provided by the MOIW microemulsion in relation to estradiol. Before administration of the MOIW microemulsion to the female subject, the ratio of free testosterone to estradiol was 1:925—a ratio believed associated with menopausal symptoms. The half dose improved this ratio to 1:125, a ratio confirmed to provide a reduction in perimenopausal symptoms for the female subject, especially regarding hot flashes, mood swings, and lethargy.

When on the dose the perimenopausal subject achieved a 1:53 ratio of free testosterone to estradiol in comparison to the original 1:925 ratio, an approximate 94% reduction. In relation to the half dose, the 1:53 ratio provided by the dose was confirmed to provide a further reduction in menopausal symptoms in, that in addition to having a positive effect on hot flashes, mood swings, and lethargy, the dose also had a positive effect on night sweats and libido.

Additionally, it was established that a therapeutically effective weight ratio of DHEA to chrysin reaches from 1:1 as previously established in Example 4 down to a DHEA to chrysin weight ratio of 10:1. It was unexpected that the DHEA to chrysin weight ratio could be reduced from 1:1 to 10:1 and maintain a therapeutically effective free testosterone to estradiol ratio in the bloodstream in the context of menopausal symptoms. Thus, while the exact lower chrysin limit for a therapeutically effective ratio of DHEA to chrysin, is not known, it is believed to be a weight ratio of approximately 10:0.5, as it is known that DHEA:chrysin weight ratios from 1:1 down to 10:1 provide a therapeutically effective free testosterone to estradiol ratio in the bloodstream in relation to menopausal symptoms. Thus, an approximate 10:1 weight ratio of DHEA to chrysin is preferred to reduce chrysin administration while optimizing the MOIW microemulsion from a dosing perspective.

Also of note is that after approximately 20 days of daily dosing (11 days half-dose; 9 days dose) and a 60-day off period, the ratio of free testosterone to estradiol had increased to 1:270, but this was still less than half the 1:925 amount observed prior to MOIW administration. While a portion of the observed reduced estradiol during the 60-day off period is likely the result of natural hormone cycle regulation, a contribution to the reduction is believed attributable to the MOIW microemulsion. Thus, it is believed that the MOIW microemulsion provides a relatively long-lasting improvement in free testosterone to estradiol ratio in perimenopausal subjects, even when daily dosing is stopped.

In addition to establishing that a DHEA:chrysin ratio of 1:1 was therapeutically effective, previous Example 4 also established that a 20 mg daily dose of DHEA could be used. However, the present Example demonstrates that a DHEA dose of 100 mg per day is preferred to achieve therapeutically effective free testosterone to estradiol ratios. The 100 mg per dose of DHEA is preferred due to the 1:53 free testosterone to estradiol ratio obtained. Other positive health effects outside of menopausal symptom reduction may result from the higher DHEA levels per dose. Optimal therapeutic effect for reduction in menopausal symptoms is believed to be achieved with 100 mg to 300 mg of DHEA per day for most subjects, with an increase to 500 mg of DHEA per day being beneficial for some.

From the observed results, it appears both dose and administration length are factors that influence the positive effects of the MOIW microemulsion on menopausal symptoms. Based on these results, a half-dose of the MOIW microemulsion may be appropriate for addressing minor menopausal symptoms over time, while a dose is appropriate when the symptoms are more severe. It is also believed that once severe symptoms are addressed with a daily dose, an attempt should be made to switch the subject to a half-dose and then possibly to an intermittent half-dose in the event either dosing reduction continues to adequately address the menopausal symptoms.

Example 6: Postmenopausal Subject Blood Concentration Hormone Level Changes in Response to MOIW Microemulsion Dosing Table 3 below provides blood concentration hormone levels for a postmenopausal subject prior to intra-oral administration of the MOIW microemulsion of Example 2, after a dose (5 mL), and after approximately 20-days of daily intra-oral administration of a dose. A therapeutically effective amount per dose of DHEA is believed in the 80 mg to 300 mg range for postmenopausal subjects with an approximate dose of 100 mg preferred at present as their response to the DHEA is more consistent than observed for the perimenopausal subject.

TABLE 3

| Blood Hormone Concentration | Before OIW Microemulsion | On Dose | On Dose After ~20-Days |
|---|---|---|---|
| DHEA-s (ug/dL) | 79 | 641 | 549 |
| Estradiol (pg/mL) | N/A | 18 | 16 |
| Total Testosterone (ng/dL) | 19 | 55 | 74 |
| SHBG (nmol/L) | 142 | 60 | 65 |
| Calculated Free Testosterone (ng/dL) | 0.1 | 0.7 | 0.8 |
| Ratio of Free Testosterone to Estradiol | N/A | 1:26 | 1:20 |

The ability of the MOIW microemulsion to support or increase total testosterone serum levels was established for a postmenopausal subject. A therapeutically effective free testosterone to estradiol ratio in the postmenopausal symptom context was provided by the MOIW microemulsion.

The MOIW microemulsion established the ability to reduce SHBG blood levels more significantly for the postmenopausal subject than observed in the perimenopausal subject—a greater than 50% reduction for the postmenopausal subject vs. an approximate 20% reduction for the perimenopausal subject. The MOIW microemulsion also simultaneously and significantly increased total and thus free testosterone levels. In fact, the free testosterone levels observed for the daily dose treated perimenopausal and postmenopausal subjects was practically identical, even though the postmenopausal subject started with a slightly increased free testosterone level in relation to her perimenopausal counterpart.

The free testosterone to estradiol ratio obtained from the postmenopausal subject was observed to improve in relation to the initial day-after-dosing improvement after approximately 20 days of daily intra-oral administration. The postmenopausal subject showed an even greater amount of free testosterone (1:20) in relation to estradiol than the perimenopausal subject (1:53) and achieved this ratio much quicker than her perimenopausal counterpart at an approximate 20-day dosing duration. The postmenopausal 1:20 ratio was confirmed to provide a significant reduction in menopausal symptoms, that in addition to substantially eliminating hot flashes, mood swings, and lethargy, also had a positive effect on night sweats, and especially in the context of libido.

Due to the more direct and immediate ability of the MOIW microemulsion to "move the numbers" for the postmenopausal subject in relation to the perimenopausal subject, it is less likely that intermittent dosing would be optimal for the postmenopausal subject; however, a reduction from a daily dose to a daily half-dose may be able to adequately control menopausal symptoms in some postmenopausal subjects.

Example 7: Perimenopausal Subject Blood Concentration Hormone Level Changes in Response to Double MOIW Microemulsion Dosing In relation to the 1:26 ratio of free testosterone to estradiol obtained with daily dosing of the postmenopausal subject, the question arose whether two daily doses delivering a total of 200 mg of DHEA and 20 mg of chrysin could provide further reduction in the 1:53 ratio observed for the perimenopausal subject. From related trials it was known that this perimenopausal subject had greater variability in hormone blood concentration levels in relation to dosing than most perimenopausal subjects, thus being a "low absorber".

Table 4 below provides blood concentration hormone levels for a low absorber perimenopausal subject after approximately 20 days of ante meridiem and post meridiem intra-oral administration of the MOIW microemulsion of Example 2. Thus, the subject was consuming 10 mL of the MOIW microemulsion daily.

TABLE 4

| Blood Hormone Concentration | On Double Dose |
|---|---|
| DHEA-s (ug/dL) | 1036 |
| Estradiol (pg/mL) | 25 |
| Total Testosterone (ng/dL) | 78 |
| SHBG (nmol/L) | 85 |
| Calculated Free Testosterone (ng/dL) | 0.7 |
| Ratio of Free Testosterone to Estradiol | 1:36 |

The ability of the double dose of the MOIW microemulsion to increase total testosterone serum levels while simultaneously reducing estradiol serum levels was established for the low absorber perimenopausal subject. In comparison to the single daily dose data from Table 2 for a perimenopausal subject, the double dose of the MOIW microemulsion provided a nearly doubled bloodstream DHEA-s concentration and a similar to slightly lower total testosterone (86 vs. 78) bloodstream concentration. However, a marked reduction was observed in the ratio of free testosterone to estradiol with the dose providing a 1:53 ratio while the double MOIW microemulsion dose provided a 1:36 ratio, an approximate 30% reduction resulting from identical free testosterone values of 0.7. Thus, the double dose provided the improvement in free testosterone to estradiol ratios primarily due to a significant reduction in estradiol, from 37 to 25, and from a significant reduction in SHBG, from 103 to 85. For this perimenopausal subject, the double dose eliminated hot flashes, mood swings, and lethargy, while providing the desired positive effect on night sweats and libido.

Example 8: MOIW Microemulsion Effect on DHEA-s vs. SHBG for a Perimenopausal Subject Examples 5, 6, and 7 established the unexpected ability of the MOIW microemulsion to significantly increase the free testosterone blood concentration in relation to estradiol in response to elevated DHEA-s bloodstream concentrations. While the ratio of DHEA to chrysin in the MOIW microemulsion is believed the significant factor in estradiol reduction in relation to total testosterone increase, the MOIW microemulsion's ability to decrease SHBG levels was also unexpected for perimenopausal subjects. Due to the hormone level variability in perimenopausal subjects, an expected SHBG response would have been little or no change, with any observed increase in free testosterone chiefly originating from the increase in total testosterone, not also increasing due to SHBG reduction.

Figure 6:
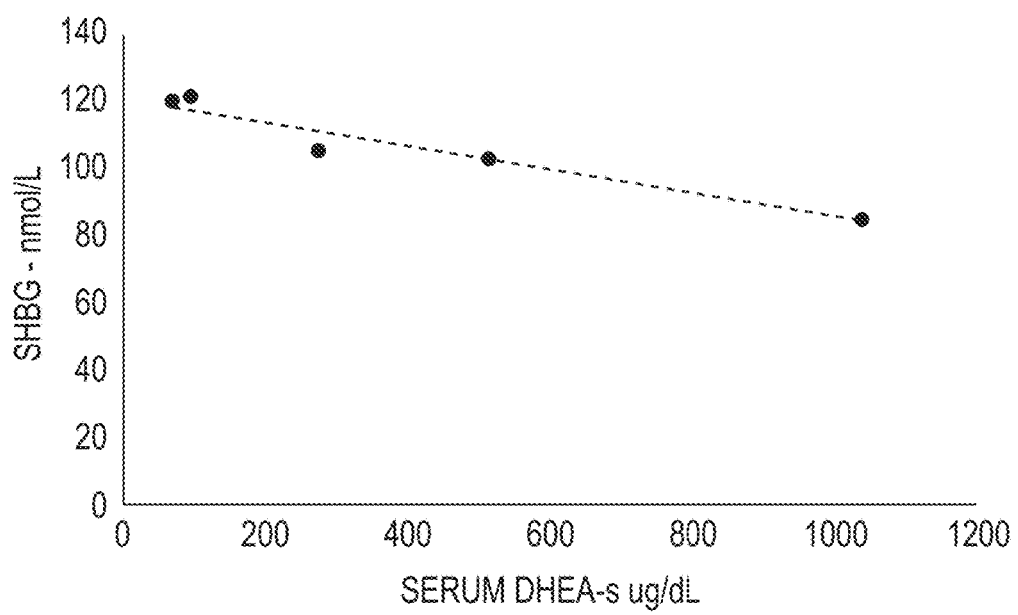
FIG. 6 plots the SHBG and DHEA-s blood concentrations obtained from a perimenopausal female subject in response to administration of the MOIW microemulsion.

FIG. 6 plots the SHBG and DHEA-s blood concentrations obtained from a perimenopausal subject in response to administration of the MOIW microemulsion. A decrease in SHBG with increasing DHEA-s concentration was observed. While this result is observable from Table 2, the near linearity demonstrated in the graphical relationship was not expected for a perimenopausal subject. The decrease in SHBG is believed to be the chief factor providing the improvement in libido for the perimenopausal subject.

This Example confirms that the MOIW microemulsion when consumed intra-orally by a perimenopausal subject was able to provide increased levels of DHEA-s and free testosterone in the bloodstream in a near linear relationship while simultaneously decreasing SHBG and estradiol concentrations.

Example 9: Combination Therapy of the MOIW Microemulsion with Progesterone

To provide a further menopausal symptom reduction in relation to the Example 2 MOIW microemulsion alone, especially regarding weight gain, the nonderivatized hormone progesterone may be combined with the MOIW microemulsion. As previously mentioned, nonderivatized progesterone may be delivered by the MOIW microemulsion as an additional alcohol-soluble species while derivatized progesterone may be provided in the MOIW microemulsion in the event a greater hormone density is desired. However, delivering nonderivatized progesterone as an additional alcohol-soluble species in the MOIW microemulsion is preferred.

The progesterone for this combination therapy also may be suppled orally or topically by conventional preparations, such as with PROMETRIUM™ as available by prescription for the conventional oral preparation or with PROGONOL™ or PRO-GEST™ as available from Bezwecken or Emerita, respectively, for the conventional topical preparation. However, these conventional preparations are not preferred in relation to MOIW microemulsion intra-oral delivery or in relation to a thickened MOIW microemulsion topical serum as discussed further below.

Presently there are restrictions on orally delivered progesterone. Thus, even though the MOIW microemulsion does not suffer from the adverse side-effects of conventional oral formulations underlying these restrictions, topical progesterone is presently preferred for the combination therapy of the MOIW microemulsion with progesterone.

Unlike conventional macroemulsion topicals, the preferred topical for progesterone delivery is a thickened MOIW microemulsion, as such thickened MOIW microemulsions have similar constituents to the present MOIW microemulsion, but have higher viscosities and can topically deliver nonderivatized progesterone with high efficiency. Unlike the present MOIW microemulsion, the thickened MOIW microemulsions include both an alcohol-soluble alcohol-lipid phase thickener and a water-soluble continuous-phase thickener. Additional details and applicability of thickened MOIW microemulsions for topical use may be found in U.S. Provisional Pat. App. 63/272,328 having a filing date of Oct. 27, 2021, entitled "Progesterone Topical" and in Int. App. PCT/US22/46677 having a filing date of Oct. 14, 2022, entitled "Transdermal Microemulsion Delivery Systems for Alcohol-Soluble Species Including Nonderivatized Hormones".

Dosing for this combination therapy includes use of the present MOIW microemulsion as previously described with the addition of progesterone. For use in the alleviation of menopausal symptoms, from 5 mg to 18 mg of progesterone is preferably administered daily, with 8 mg to 16 mg of progesterone providing a therapeutically effective dose for postmenopausal subjects and with 8 mg to 10 mg of progesterone providing a therapeutically effective dose for perimenopausal subjects. A therapeutically effective dose for most perimenopausal subjects was determined to be approximately 8 mg.

A preferred dosing for this combination therapy includes intra-oral administration of the MOIW microemulsion ante meridiem with topical administration of the thickened MOIW post meridiem. For perimenopausal subjects using intermittent dosing of the MOIW microemulsion, the same intermittent dosing is also preferred for the thickened MOIW microemulsion progesterone topical.

In relation to the MOIW microemulsion alone, for peri- and postmenopausal subjects having continued weight gain, this combination therapy was established to provide a reduction in weight gain.

Example 10: Combination Therapy of the MOIW Microemulsion with Progesterone and Estrogen To provide a further menopausal symptom reduction in relation to the Example 2 MOIW microemulsion alone, especially for postmenopausal subjects or effectively postmenopausal subjects having prior surgical removal or pharmaceutical/radiation inactivation of the uterus and/or ovaries regarding weight gain, hot flashes, and vaginal dryness, the nonderivatized hormones progesterone and estrogen may be combined with the MOIW microemulsion of Example 2. As previously mentioned, nonderivatized progesterone and estrogen may be delivered by the MOIW microemulsion as additional alcohol-soluble species, while derivatized progesterone and/or estrogen may be provided in the MOIW microemulsion in the event a greater hormone density is desired. However, delivering nonderivatized progesterone and estrogen as additional alcohol-soluble species in the MOIW microemulsion is preferred.

In the event weight gain is fully controlled by the MOIW microemulsion, the progesterone may be omitted. However, in our experience subjects in need of additional estrogen will most likely benefit from the progesterone.

The progesterone and estrogen for this combination therapy may be supplied orally or topically by conventional preparations, such as with PROMETRIUM™ and ESTRACE™ as available by prescription, respectively, for the conventional oral preparations or with PROGONOL™/PRO-GEST™ and DIVIGEL™ as available from Bezwecken/Emerita and Vertical Pharmaceuticals, respectfully, for the conventional topical preparation. However, these conventional preparations are not preferred in relation to MOIW microemulsion intra-oral delivery or in relation to a thickened MOIW microemulsion topical serum as discussed further below.

Presently there are restrictions on orally delivered progesterone and estrogen. Thus, even though the MOIW microemulsion does not suffer from the adverse side-effects of conventional oral formulations underlying these restrictions, topical progesterone and estrogen are presently preferred for the combination therapy of the MOIW microemulsion with progesterone and estrogen.

Unlike conventional macroemulsion topicals, the preferred topical for progesterone and estrogen delivery is a thickened MOIW microemulsion, as such thickened MOIW microemulsions have similar constituents to the present MOIW microemulsion, but have higher viscosities and can topically deliver nonderivatized progesterone and estrogen with high efficiency. Unlike the present MOIW microemulsion, the thickened MOIW microemulsions include both an alcohol-soluble alcohol-lipid phase thickener and a water-soluble continuous-phase thickener. Additional details and applicability of thickened MOIW microemulsions for topical use may be found in U.S. Provisional Pat. App. 63/272,328 having a filing date of Oct. 27, 2021, entitled "Progesterone Topical" and in Int. App. PCT/US22/46677 having a filing date of Oct. 14, 2022, entitled "Transdermal Microemulsion Delivery Systems for Alcohol-Soluble Species Including Nonderivatized Hormones".

Dosing for this combination therapy includes use of the present MOIW microemulsion as previously described with the addition of progesterone and estrogen. For progesterone use in the alleviation of postmenopausal symptoms in combination with the MOIW microemulsion, from 5 mg to 18 mg of progesterone is preferably administered daily, with 8 mg to 16 mg of progesterone providing a therapeutically effective dose. For estrogen use in the alleviation of postmenopausal symptoms in combination with the MOIW microemulsion, from 0.25 mg to 3 mg of estrogen is preferably administered daily, with 1 mg to 2.5 mg of estrogen providing a therapeutically effective dose for most subjects.

A preferred dosing for this combination therapy includes intra-oral administration of the MOIW microemulsion ante meridiem with topical administration of the thickened MOIW including the progesterone post meridiem with addition of topical administration of the thickened MOIW microemulsion including estrogen ante meridiem. Progesterone and estrogen may be incorporated into the same thickened MOIW microemulsion topical or as two different thickened MOIW microemulsion topicals to provide additional dosing variability. When the progesterone and the estrogen are incorporated into the same thickened MOIW microemulsion, topical administration is preferably post meridiem.

In relation to the MOIW microemulsion alone for postmenopausal subjects having continued hot flashes and vaginal dryness symptoms or these symptoms in combination with continued weight gain, this combination therapy was established to provide an improvement in hot flashes and vaginal dryness with estrogen alone and for weight gain with the addition of progesterone.

Example 11: Combination Therapy of the MOIW Microemulsion with Cortisol

To provide a further menopausal symptom reduction in individuals with hampered adrenal function in relation to the Example 2 MOIW microemulsion alone, especially regarding lethargy, the nonderivatized hormone cortisol may be combined with the MOIW microemulsion. As previously mentioned, nonderivatized cortisol may be delivered by the MOIW microemulsion as an additional alcohol-soluble species.

The cortisol also may be suppled orally or topically by conventional preparations, such as with HYDROCORT™, ALPHOSYL™, AQUACORT™, and CORTEF™ as available by prescription for the conventional oral preparation or with Cortizone-10 cream or equivalent as available from Sanofi for example, for the conventional topical preparation. However, these conventional preparations are not preferred in relation to MOIW microemulsion intra-oral delivery or in relation to a thickened MOIW microemulsion topical serum as discussed further below.

Unlike conventional macroemulsion topicals, the preferred topical for cortisol delivery is a thickened MOIW microemulsion, as such thickened MOIW microemulsions have similar constituents to the present MOIW microemulsion, but have higher viscosities and can topically deliver nonderivatized cortisol with high efficiency. Unlike the present MOIW microemulsion, the thickened MOIW microemulsions include both an alcohol-soluble alcohol-lipid phase thickener and a water-soluble continuous-phase thickener. Additional details and applicability of thickened MOIW microemulsions for topical use may be found in U.S. Provisional Pat. App. 63/272,328 having a filing date of Oct. 27, 2021, entitled "Progesterone Topical" and in Int. App. PCT/US22/46677 having a filing date of Oct. 14, 2022, entitled "Transdermal Microemulsion Delivery Systems for Alcohol-Soluble Species Including Nonderivatized Hormones".

Dosing for this combination therapy includes use of the present MOIW microemulsion as previously described with the addition of cortisol. For use in the alleviation of menopausal symptoms, from 2 mg to 20 mg of cortisol is preferably administered daily, with 5 mg to 18 mg of cortisol providing a preferred therapeutically effective dose for most subjects having hampered adrenal function.

A preferred dosing for this combination therapy includes intra-oral administration of the MOIW microemulsion ante meridiem with topical administration of the thickened MOIW post meridiem. The cortisol may be incorporated into a single thickened MOIW microemulsion or may be included with a progesterone or progesterone and estrogen thickened MOIW microemulsion, in the event combination therapy is desired with cortisol and progesterone or progesterone and estrogen in addition to the present MOIW microemulsion.

In relation to the MOIW microemulsion alone, for peri- and postmenopausal subjects having continued lethargy, this combination therapy was established to provide an improvement in lethargy.

To provide a clear and more consistent understanding of the specification and claims of this application, the following definitions are provided.

Intra-oral delivery means that a substantial portion of the delivery into the bloodstream that occurs upon oral administration of the liquid including the deliverable occurs by transmucosal absorption through the mouth, throat and esophagus before the liquid reaches the stomach. For intra-oral delivery, the subject takes the composition into the oral cavity, holds the composition for a time within the oral cavity, and then swallows the remaining composition. For droplets to be considered suitable for intra-oral delivery, the average droplet diameter is at most 125 nm. Intra-oral delivery is believed to increase with decreasing average droplet diameter, with average droplet diameters of approximately 25 nm being preferred.

An alcohol-soluble species is a species that is insoluble in water and has a greater solubility in ethanol than in medium chain triglyceride (MCT) oils. For example, the nonderivatized hormone DHEA is soluble in ethanol up to approximately 150 mg/mL, thus being freely soluble, while having a solubility in MCT oil of only up to approximately 10 mg/mL, thus being only sparingly soluble. Alcohol-soluble species are preferably pharmacologically active, more preferably are a drug or a supplement, and neither include nor are water. Thus, liquids and solids may exist that technically are soluble in alcohol, but because they also are soluble in water or more or equivalently soluble in MCT oils than in ethanol are not "alcohol-soluble species".

Nonderivatized hormones are chemically identical to hormones made by the human body and are not synthetically modified with fatty esters or other pendant groups.

Directly solubilize the nonderivatized hormone means that unlike in conventional systems, the nonderivatized hormone does not require synthetic conversion to an esterified state to be solubilized, thus the microemulsion "directly solubilizes" the nonderivatized hormone.

Phosphatidylcholine (PC) molecules are a subset of the larger set of phospholipids and are commonly used to form liposomes in water. When placed in water without other constituents, PC forms liposomes. In the presence of an oil, the application of sufficient shear forces to the PC liposomes in water can produce monolayer structures, including micelles. PC has a head that is water-soluble and a tail that is much less water-soluble in relation to the head. PC is a neutral lipid, but carries an electric dipole moment of about 10 D between the head and the tail, making the molecule itself polar.

Tocopheryl polyethylene glycol succinate 1000 (TPGS) is generally considered a surfactant having a non-polar, oil-soluble "Vitamin E" tail and a polar, water-soluble polyethylene glycol head. TPGS is a member of the polyethylene glycol derivatives that also include polysorbate 20, 40, 60, and 80.

MCT oils are triglycerides whose fatty acids have an aliphatic tail of 6-12 carbon atoms.

Pregnenolone is an endogenous steroidal hormone produced in the brain that is a precursor to progesterone. Progesterone is an endogenously produced steroidal hormone produced by the ovaries that affects the uterus and is involved in the menstrual cycle.

Estrogen is a term used to describe multiple estrogenic hormones that stimulate the development and maintenance of female sex characteristics, including estrone (E1), estradiol (E2), and estriol (E3). Estradiol is produced in the ovaries and is the most powerful naturally occurring female hormone. Synthesized versions are used medicinally to treat estrogen deficiency and breast cancer. Estriol is a metabolite of estradiol having a synthetic form used to treat estrogen deficiency.

DHEA is a steroidal hormone naturally produced in the body by the adrenal gland that the body then converts to other hormones, including DHT, testosterone, and estrogen. Thus, being like pregnenolone as a precursor hormone. Some believe that taking DHEA supplements to maintain DHEA levels could have a positive effect on menopausal symptoms by possibly slowing the aging process and thus improving well-being, cognitive function, and body composition. However, to date research has not confirmed this belief.

Chrysin is classified as a flavonoid that may be extracted from some plants, honey, and bee propolis. Chrysin is proposed to have anti-inflammatory properties in addition to increasing testosterone levels in men; however, neither function has been proven to date. Chrysin is known to have extremely poor adsorption from the intestine.

Diindolylmethane (DIM) is a compound derived from indole-3-carbinol which is found in cruciferous vegetables such as broccoli, brussels sprouts, cabbage, and kale. Thus, the body forms DIM when cruciferous vegetables such as cabbage are eaten. DIM is believed to support estrogen levels by encouraging healthy estrogen metabolism by increasing the ratio of 2-hydroxy to 16-hydroxy estrogens. DIM has been reported to induce the antioxidant response element (ARE) and some believe DIM to have positive effects on prostate, breast, uterine, and colon cancer.

Maca is a root vegetable related to radish that some believe to have the ability to improve the menopausal symptoms of hot flashes, vaginal dryness, mood swings, sleep problems, irritability, and energy levels.

Dan Gui is a root from a plant related to celery and is sometimes referred to as "female ginseng". Some believe Dan Gui to have a positive effect on hot flashes and night sweats.

Korean fermented ginseng is a member of the *Panax Ginseng* family that some believe to reduce the severity of hot flashes and night sweats, in addition to improving female libido.

Room temperature and pressure means from 20 to 27 degrees Celsius at approximately 100 kPa.

Solid means a substance that is not a liquid or a gas at room temperature and pressure. A solid substance may have one of a variety of forms, including a monolithic solid, a powder, a gel, or a paste.

A micronized powder is a solid powder having an average particle diameter from 0.1 to 100 microns. Micronized powders of nonderivatized hormones generally have average particle diameters of 50 microns and less.

Liquid means as substance that is not a solid or a gas at room temperature and pressure. A liquid is an incompressible substance that flows to take on the shape of its container.

Solutions lack an identifiable interface between the solubilized molecules and the solvent. In solutions, the solubilized molecules are in direct contact with the solvent.

Solubilized means that the alcohol-soluble species to be delivered is in the solution of the droplet. When solubilized, dissociation (thus, liquid separation or solid formation) of the alcohol-soluble species does not result in droplet average particle diameters greater than 200 nm as determined by DLS and discussed further below, or by the formation of precipitated crystals of the alcohol-soluble species visible with the naked eye. Thus, if either average particle diameters greater than 200 nm or precipitated crystals visible to the naked eye form, the alcohol-soluble species is not solubilized in the solution of the droplet. If an alcohol-soluble species is not solubilized in the solution, it is insoluble in the solution. In many respects, solubility may be thought of as a concentration dependent continuum. For example, the following descriptive terms may be used to express solubility of a solute in a solvent (grams solid/mL of solvent) at 25 degrees Celsius:

TABLE 5

| Descriptive Level | Parts solvent per 1 part of solute |
| --- | --- |
| Very Soluble | Less than 1 |
| Freely Soluble | From 1 to 10 |
| Soluble | From 10 to 30 |
| Sparingly Soluble | From 30 to 100 |
| Slightly Soluble | From 100 to 1000 |
| Very Slightly Soluble | From 1000 to 10,000 |
| Insoluble | More than 10,000 |

Dissociation occurs when a previously solubilized solid or liquid leaves a solution and is no longer in direct contact with a solvent of the solution. Dissociation of solids from the solvent occurs through recrystallization, precipitation, and the like. Dissociation of liquids from the solvent occurs through separation and the formation of a visible meniscus between the solvent and the dissociated liquid.

A shelf-stable microemulsion may be determined in one of two ways. One way to establish that a microemulsion stored in a sealed container substantially excluding air and moisture is shelf-stable is when dissociation of a solid does not occur and the oil phase droplets in the water do not change in average diameter by more than +/−20% at about 25° C. for a time period of at least 3 months to 2 years, preferably for a time period of at least 6 months to 2 years, and more preferably, for a time period of at least 1 year to 2 years. Another way to establish that a microemulsion is shelf-stable is when dissociation of a solid does not occur and the oil phase droplets in the water do not separate into a visibly distinct phase with a visible meniscus when stored in a sealed container substantially excluding air and moisture at about 25° C. for a time period of at least 6 months to 2 years, and more preferably, for a time period of at least 1 year to 2 years. Either type of dissociation means that the microemulsion is not shelf-stable.

Emulsions are mixtures of two or more liquids that do not solubilize. Thus, one of the liquids carries droplets of the second liquid. The droplets of the second liquid may be said to be dispersed in a continuous phase of the first liquid. An interface, separation, or boundary layer exists between the carrier liquid (continuous phase) and the droplets of the second liquid. Emulsions may be macroemulsions, pseudo-emulsions, microemulsions, or nanoemulsions. The primary difference between the emulsion types is the size (average diameter) of the droplets dispersed in the continuous phase and whether the droplets are thermodynamically stable in the continuous phase. Macroemulsions and pseudo-emulsions have average droplet diameters from 1 to 20 micrometers. Microemulsions and nanoemulsions have smaller average droplet diameters in the continuous phase than macroemulsions and pseudo-emulsions. Microemulsions are thermodynamically stable while nanoemulsions are not even though their average droplet diameters may overlap in size.

Macroemulsions are thermodynamically unstable but kinetically stable dispersions of oil in water, with oil being defined as any water-insoluble liquid. By thermodynamically unstable it is meant that once created, the macroemulsion is always reverting to the original, immiscible state of the oil and water constituents (demulsification), but this break down is slow enough (thus, kinetically "stable") that the macroemulsion may be considered stable from an intended use practicality perspective. Macroemulsions scatter light effectively and therefore appear milky because their droplets are greater in diameter than the wavelength of visible light. The IUPAC definition of a macroemulsion is an "emulsion in which the particles of the dispersed phase have diameters from approximately 1 to 100 micrometers. Macroemulsions comprise large droplets and thus are "unstable" in the sense that the droplets sediment or float, depending on the densities of the dispersed phase and dispersion medium."

Pseudo-emulsions are dispersions of oil in water, with oil being defined as any water-insoluble liquid, including tiny (micronized) solid granules that are not fully solubilized in the oil droplets. The term "pseudo-emulsion" is used as these mixtures are not true emulsions as the solid granules are not fully solubilized into the droplets. The droplets of a pseudo-emulsion have an average droplet diameter of 1 to 20 micrometers, thus being a "solid granule modified macroemulsion".

Microemulsions are thermodynamically stable dispersions of oil in water, with oil being defined as any water-insoluble liquid. Microemulsion are made by simple mixing of the components. Thus, microemulsions spontaneously form or "self-assemble" and do not require high-energy forces to form. Unlike macroemulsions, microemulsions do not substantially scatter light. The IUPAC definition of a microemulsion is a "dispersion made of water, oil, and surfactant(s) that is an isotropic and thermodynamically stable system with dispersed domain diameter varying approximately from 1 to 100 nm, usually 10 to 50 nm." Thus, the droplets of a microemulsion are approximately three orders of magnitude smaller than the droplets of a macroemulsion and are thermodynamically stable.

Nanoemulsions have average droplet diameters from 10 to 125 nanometers, thus being at least an order of magnitude smaller in average droplet diameters than macro- and pseudo-emulsions. Nanoemulsions are made with mechanical, high-energy forces—such as provided by high-pressure homogenization, high-shear mixers, such as bead mills and rotor-stator mixers, and ultrasonic mixers. While the average droplet diameter of nanoemulsions and microemulsions formally overlap, in practice, the average droplet diameter of nanoemulsions is or becomes larger than those of microemulsions, as lacking the thermodynamic stability of microemulsions, the average droplet diameter of nanoemulsions is forever increasing. It is possible to apply the high energy forces required to form a nanoemulsion to a composition capable of forming a thermodynamically stable microemulsion, however, this will result in a microemulsion as the composition would have "self-assembled" without the high energy forces to form the microemulsion.

Droplets or liquid particles are formed by the hydrophobic "oil" phase of a microemulsion and are carried by the hydrophilic continuous phase. The exterior of the droplets is defined by a boundary layer that surrounds the volume of each liquid droplet. The boundary layer of a droplet defines the exterior surface of the droplets forming the dispersed oil phase of the microemulsion. The continuous phase of the microemulsion resides exterior to the boundary layer of the droplets, and thus, carries the droplets.

Continuous phase means the portion of a microemulsion that carries the droplets that include the substance to be delivered. For example, the modified oil-in-water microemulsions (non-polar droplets in polar continuous phase) addressed herein have oil/alcohol droplets including the alcohol-soluble species to be delivered carried in a polar, "water" continuous phase. While the words "water" and "oil" are used, the "water" can be any liquid that is more polar than the "oil" (such as a polar oil), and the "oil" can be any liquid that is less polar than the "water. Thus, the terms "polar continuous phase" and "water continuous phase" are synonymous, unless water is specifically being discussed as one of the microemulsion components.

Average droplet diameter is determined by dynamic light scattering, sometimes referred to as a photon correlation spectroscopy. The determination is made between 20 and 25 degrees Celsius. One example of an instrument suitable for average droplet diameter determination is a Nicomp 380 ZLS particle sizer as available from Particle Sizing Systems, Port Richey, FL. DLS can determine the diameter of droplets in a liquid by measuring the intensity of light scattered from the droplets to a detector over time. As the droplets move due to Brownian motion the light scattered from two or more droplets constructively or destructively interferes at the detector. By calculating the autocorrelation function of the light intensity and assuming a droplet distribution, it is possible to determine the sizes of droplets from 1 nanometer to 5 micrometers. The instrument is also capable of measuring the Zeta potential of droplets.

A visually clear microemulsion has an average particle diameter of 200 nm and less and lacks precipitated solid crystals visible to the naked eye.

A transparent microemulsion or nanoemulsion has an average droplet diameter from 10 to 100 nanometers. Thus, a transparent microemulsion or nanoemulsion is visually clear, but a visually clear microemulsion or nanoemulsion may or may not also be transparent.

Ingestible means capable of being ingested through the mouth by a living mammal while edible means fit to be eaten, thus in contrast to being unpalatable or poisonous. Edible also means that the composition has less than the permitted amount of viable aerobic microorganisms and meets the American Herbal Products Association (AHPA) guidelines for metals, adulterants, toxins, residual solvents, and pesticides.

The term "subject" refers to a human female capable of experiencing menopausal symptoms. The terms "subject" and "patient" may be used interchangeably in reference.

The term "therapeutically effective amount or ratio" refers to the amount of a compound or ratio of compounds that, when administered, is sufficient to prevent development of, or alleviate to some extent, one or more of the symptoms associated with menopause in female humans. The term "therapeutically effective amount" also refers to the amount of a compound that is sufficient to elicit the biological or medical response of a cell, tissue, system, animal, or human that is being sought by a researcher, veterinarian, medical doctor, or clinician.

Administered "in combination" or "co-administration," refers to administration of DHEA and chrysin concomitantly in one composition, or concomitantly in different compositions, or sequentially in either order. For sequential administration to be considered administration "in combination" or "co-administration," the DHEA and the chrysin are administered separated by a time interval that permits the resultant beneficial effect for alleviating menopausal symptoms in a female subject.

The terms "treat," "treating," and "treatment" are meant to include alleviating or abrogating one or more of the symptoms associated with menopause.

The terms "topical" and "transdermal" are used interchangeably to refer to a composition that when applied to the skin of a subject transfers a deliverable through the skin to the bloodstream of the subject. Outside of this application, one may find the word "topical" used to describe a composition that only transfers a deliverable to the skin and not to the bloodstream.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these ranges may independently be included in the ranges, and are also encompassed within the invention, subject to any specifically excluded limit in the stated range. Where the stated range includes one or both of the upper and lower limits, ranges excluding either or both of those included limits are also included in the invention.

Unless otherwise indicated, all numbers expressing quantities of ingredients, ratios, and the like used in the specification and claims are to be understood as indicating both the exact values as shown and as being modified by the term "about". Thus, unless indicated to the contrary, the numerical values of the specification and claims are approximations that may vary depending on the desired properties sought to be obtained and the margin of error in determining the values. At the very least, and not as an attempt to limit the application of the doctrine of equivalents to the scope of the claims, each numerical parameter should at least be construed considering the margin of error, the number of reported significant digits, and by applying ordinary rounding techniques.

The terms "a", "an", and "the" used in the specification claims are to be construed to cover both the singular and the plural, unless otherwise indicated or contradicted by context. No language in the specification should be construed as indicating any non-claimed element to be essential to the practice of the invention.

While various aspects of the invention are described, it will be apparent to those of ordinary skill in the art that other aspects and implementations are possible within the scope of the invention. Accordingly, the invention is not to be restricted except in light of the attached claims and their equivalents.

What is claimed is:

1. A composition for reducing menopausal symptoms, the composition comprising:
   an alcohol-soluble species, the alcohol-soluble species comprising dehydroepiandrosterone, pregnenolone, and a polyphenol, where a ratio of the dehydroepiandrosterone to the polyphenol is from 1:1 to 12:1 by weight; and
   a modified oil-in-water microemulsion comprising a modified oil phase and a modified polar continuous phase,
   where the alcohol-soluble species is solubilized in the modified oil phase, the modified oil phase comprising a phospholipid, a polyethylene glycol derivative, an oil, and an alcohol,
   where the phospholipid is a glycerophospholipid isolated from lecithin,
   where the glycerophospholipid isolated from lecithin is chosen from phosphatidylcholine, phosphatidylethanolamine, phosphatidylinositol, ceramide phosphoryl ethanolamine, ceramide phosphoryl choline (SPH), and combinations thereof,
   where the polyethylene glycol derivative is chosen from polyethylene glycol modified vitamin E, polysorbate 40, polysorbate 60, polysorbate 80, and combinations thereof,
   where the alcohol is ethanol,
   where the modified polar continuous phase comprises a sugar or sugar alcohol and water,
   where the modified oil-in-water microemulsion is shelf-stable, and
   where the modified oil-in-water microemulsion is visually clear.

2. The composition of claim 1, where the modified oil-in-water microemulsion is transparent.

3. The composition of claim 1, where droplets of the modified oil phase have an average droplet diameter of 1 to 100 nanometers.

4. The composition of claim 1, where droplets of the modified oil phase have an average droplet diameter of 7 to 30 nanometers.

5. The composition of claim 1, where the modified oil phase directly solubilizes the dehydroepiandrosterone, the pregnenolone, and the polyphenol.

6. The composition of claim 1, where the composition is ingestible and edible.

7. The composition of claim 1, where a ratio of the phospholipid, to the oil, to the polyethylene glycol derivative, to the alcohol, to the sugar or sugar alcohol, and to the water is 1:2:0.6-3.3:4:9:1-3±20% by weight.

8. The composition of claim 1, where a ratio of the oil to the alcohol-soluble species is 1:0.02 to 1:0.3±10% by weight.

9. The composition of claim 1, where the alcohol-soluble species comprises from 0.25% to 3% of the composition by weight.

10. The composition of claim 1, where the alcohol-soluble species further comprises a nonderivatized hormone chosen from testosterone, progesterone, an estrogen, cortisol, and combinations thereof.

11. The composition of claim 1, where the polyphenol is chosen from chrysin, hesperetin, apigenin, and combinations thereof.

12. The composition of claim 1, where the polyphenol is chrysin.

13. The composition of claim 1, where the alcohol-soluble species further comprises a plant sterol.

14. The composition of claim 13, where the plant sterol is chosen from tribulus terrestris, yohimbe, and combinations thereof.

15. The composition of claim 1, where the alcohol-soluble species further comprises diindolylmethane.

16. The composition of claim 1, comprising from 1% to 4% of the dehydroepiandrosterone by weight.

17. The composition of claim 1, comprising from 0.05% to 1% of the pregnenolone by weight.

18. The composition of claim 12, comprising from 0.05% to 2.5% of the chrysin by weight.

19. The composition of claim 15, comprising from 0.05% to 1% of the diindolylmethane by weight.

20. The composition of claim 15, where a ratio of the dehydroepiandrosterone to the pregnenolone to the polyphenol to the diindolylmethane is 10:1-3:1-10:1±20% by weight.

21. The composition of claim 1, where the ratio of the dehydroepiandrosterone to the polyphenol is from 4:1 to 12:1 by weight.

22. The composition of claim 1, where the ratio of the dehydroepiandrosterone to the polyphenol is 10:1±20% by weight and the polyphenol is chrysin.

23. The composition of claim 1, the modified oil phase further comprising a derivatized hormone, the derivatized hormone chosen from testosterone-propionate, testosterone-cypionate, testosterone-enanthate, testosterone-phenylpropionate, and combinations thereof.

24. The composition of claim 1, the modified oil phase further comprising an oil-soluble deliverable chosen from cannabis extracts, terpenes, and combinations thereof.

25. The composition of claim 1, further comprising a water-soluble deliverable.

26. The composition of claim 25, the water-soluble deliverable chosen from Korean fermented ginseng paste extract, flavorings, and combinations thereof.

27. The composition of claim 1, where the modified oil phase and the modified polar continuous phase in combination further comprise a hybrid deliverable.

28. The composition of claim 27, the hybrid deliverable chosen from Maca extract, Dang Gui, and combinations thereof.

29. The composition of claim 1, where the glycerophospholipid isolated from lecithin is chosen from phosphatidylcholine, phosphatidylethanolamine, and combinations thereof.

30. The composition of claim 1, where the glycerophospholipid isolated from lecithin is at least 80% by weight phosphatidylcholine.

31. The composition of claim 1, where the phospholipid comprises from 3% to 10% of the composition by weight.

32. The composition of claim 1, where the polyethylene glycol modified vitamin E is tocopheryl polyethylene glycol succinate 1000.

33. The composition of claim 1, where the polyethylene glycol derivative comprises from 5% to 14% of the composition by weight.

34. The composition of claim 1, where a ratio of the phospholipid to the polyethylene glycol derivative is 1:0.4 to 1:4 by weight.

35. The composition of claim 1, where the oil is chosen from a medium chain triglyceride, a citrus oil, and combinations thereof.

36. The composition of claim 35, where the medium chain triglyceride is chosen from caproic acid (hexanoic acid), caprylic acid (octanoic acid), capric acid (decanoic acid), lauric acid (dodecanoic acid), and combinations thereof.

37. The composition of claim 35, where the medium chain triglyceride is a combination of triglycerides whose fatty acids have an aliphatic tail from 8 to 12 carbon atoms in length.

38. The composition of claim 35, the citrus oil chosen from orange oil, lemon oil, and combinations thereof.

39. The composition of claim 1, where the oil comprises from 5% to 15% of the composition by weight.

40. The composition of claim 1, where the alcohol comprises from 5% to 25% of the composition by weight.

41. The composition of claim 1, where a ratio of the oil to the alcohol is 1:1.5 to 1:4 by weight.

42. The composition of claim 1, where the sugar or sugar alcohol is chosen from sucrose, cane sugar, pure maple syrup, glycerol, and combinations thereof.

43. The composition of claim 1, where the sugar or sugar alcohol is chosen from pure maple syrup, glycerol, and combinations thereof.

44. The composition of claim 1, where the sugar or sugar alcohol is glycerol.

45. The composition of claim 1, where the sugar or sugar alcohol is glycerol and a ratio of the glycerol to the water is from 12:1 to 8:1 by weight.

46. The composition of claim 1, where the sugar or sugar alcohol comprises from 30% to 50% of the composition by weight.

47. The composition of claim 1, where the sugar or sugar alcohol comprises from 35% to 46% of the composition by weight.

48. The composition of claim 1, where the water comprises from 2% to 10% of the composition by weight.

49. The composition of claim 1, the composition comprising less than 5% by weight of the oil, where the sugar or sugar alcohol comprises from 53% to 63% of the composition by weight.

50. The composition of claim 1 comprising from 20 mg to 500 mg of the dehydroepiandrosterone per 5 milliliter volume of the composition.

51. The composition of claim 1, where the composition provides uptake of the alcohol-soluble species to the bloodstream of a subject at a therapeutically effective concentration through the oral and gastric mucosa of the subject.

52. The composition of claim 1, where the composition is configured to provide a subject a 200 to 500 ug/dL increase in blood concentration of the dehydroepiandrosterone or a metabolite of the dehydroepiandrosterone over a baseline bloodstream concentration of the dehydroepiandrosterone or a metabolite of the dehydroepiandrosterone within 60-minutes of intra-orally introducing the composition to the subject, where the composition comprises approximately 100 mg of the dehydroepiandrosterone.

53. The composition of claim 1, where after intra-oral consumption the composition is configured to provide a subject an increased blood concentration of total testosterone and a decreased bloodstream concentration of estradiol within 60-minutes of the intra-oral consumption in relation to a pre-intra-oral consumption baseline bloodstream concentration.

54. A method of making a modified oil-in-water microemulsion composition for reducing menopausal symptoms, the method comprising:
    combining alcohol-soluble species dehydroepiandrosterone, pregnenolone, and a polyphenol, where a ratio of the dehydroepiandrosterone to the polyphenol is from 1:1 to 12:1 by weight, in an oil with a phospholipid, a polyethylene glycol derivative, and an alcohol to form an alcohol-lipid mixture,
    where the polyethylene glycol derivative is chosen from polyethylene glycol modified vitamin E, polysorbate 40, polysorbate 60, polysorbate 80, and combinations thereof;
    combining a sugar or sugar alcohol and water to form a modified polar continuous phase; and
    combining the alcohol-lipid mixture and the modified polar continuous phase at atmospheric pressure to form the modified oil-in-water microemulsion,
    where the combining at atmospheric pressure is performed without high-energy forces.

55. The method of claim 54, where the combining at atmospheric pressure is performed at room temperature.

56. The method of claim 54, where the alcohol-soluble species is combined with the alcohol-lipid mixture after the alcohol-lipid mixture is combined with the modified polar continuous phase.

57. The method of claim 56, where droplets of the alcohol-lipid mixture including the alcohol-soluble species self-assemble in the modified polar continuous phase.

58. The method of claim 54, where the modified oil-in-water microemulsion further comprises a deliverable chosen from oil-soluble deliverables, water-soluble deliverables, and combinations thereof.

59. The method of claim 54, further comprising combining a hybrid deliverable with the modified polar continuous phase.

60. The method of claim 59, where a portion of the hybrid deliverable solubilizes into droplets of the alcohol-lipid mixture after the combining the alcohol-lipid mixture and the modified polar continuous phase.

\* \* \* \* \*